US007027517B1

(12) United States Patent
Nagai et al.

(10) Patent No.: US 7,027,517 B1
(45) Date of Patent: Apr. 11, 2006

(54) METHOD AND APPARATUS FOR CODING MOVING PICTURE IMAGE

(75) Inventors: Takeshi Nagai, Kawasaki (JP); Yoshihiro Kikuchi, Yokohama (JP); Tadaaki Masuda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/914,787

(22) PCT Filed: Mar. 6, 2000

(86) PCT No.: PCT/JP00/01354

§ 371 (c)(1),
(2), (4) Date: Sep. 5, 2001

(87) PCT Pub. No.: WO00/54512

PCT Pub. Date: Sep. 14, 2000

(30) Foreign Application Priority Data

Mar. 5, 1999 (JP) .................................. 11/58590

(51) Int. Cl.
*H04N 7/12* (2006.01)

(52) U.S. Cl. ............................................... 375/240.28

(58) Field of Classification Search .......... 375/240.28, 375/240.27; 370/99; 348/400.1, 426.1; H04N 7/12
See application file for complete search history.

(56) References Cited

U.S. PATENT DOCUMENTS

| 5,483,287 | A | * | 1/1996 | Siracusa | ................ | 375/240.26 |
| 5,867,231 | A | | 2/1999 | Wada et al. | | |
| 6,128,344 | A | * | 10/2000 | Aono et al. | ............ | 375/240.11 |
| 6,137,795 | A | * | 10/2000 | Tominaga et al. | .......... | 370/375 |
| 6,151,913 | A | * | 11/2000 | Lewis et al. | .................. | 62/603 |
| 6,310,897 | B1 | | 10/2001 | Watanabe et al. | | |
| 6,449,254 | B1 | * | 9/2002 | Hadjiahmad | ................ | 370/235 |
| 6,885,661 | B1 | * | 4/2005 | Hopper et al. | .............. | 370/354 |

FOREIGN PATENT DOCUMENTS

| EP | 0 677 961 | 10/1995 |
| EP | 0 731 422 | 9/1996 |
| EP | 0 737 975 | 10/1996 |
| GB | 2 327 313 | 1/1999 |
| JP | 64-13838 | 1/1989 |
| JP | 6-311052 | 11/1994 |
| JP | 6-326967 | 11/1994 |
| JP | 9-271041 | 10/1997 |
| JP | 10-336746 | 12/1998 |
| JP | 11-41108 | 2/1999 |
| JP | 11-88881 | 3/1999 |
| JP | 11-313324 | 11/1999 |
| JP | 2000-13790 | 1/2000 |

OTHER PUBLICATIONS

S. Miki, Industrial Survey Association, 34 pages, "The World of MPEG-4", Sep. 30, 1998, not translated.
R. Talluri, IEEE Communications Magazine, pp. 112-119, "Error-Resilient Video Coding in the ISO MPEG-4 Standard", Jun. 1998.

* cited by examiner

*Primary Examiner*—Nhon Diep
(74) *Attorney, Agent, or Firm*—Oblon, Spivak, McClelland, Maier & Neustadt, P.C.

(57) ABSTRACT

A video coding apparatus includes a coder section 101 for coding an input video picture, an important information constructing section 102 for extracting important information from coded information obtained by the coder section, a sync signal generator section 103 for generating a sync signal, and a bit stream reconstructing section 104 for adding the sync signal output from the sync signal generator section and the important information reconstructed by the important information constructing section to the bit stream coded by the coder section, thereby reconstructing the bit stream.

1 Claim, 21 Drawing Sheets

| VALUE | Header1 | Header2 | CODED WORD | CODED WORD LENGTH |
|---|---|---|---|---|
| 1-2 | 0 | 000 | X | 5bit |
| 3-6 | 0 | 001 | Xx | 6bit |
| 7-14 | 0 | 010 | Xxx | 7bit |
| 15-30 | 0 | 011 | Xxxx | 8bit |
| 31-94 | 0 | 100 | Xxxxx | 9bit |
| 95-158 | 0 | 101 | Xxxxxx | 10bit |
| 159-286 | 0 | 110 | Xxxxxxx | 11bit |
| 287-542 | 0 | 111 | Xxxxxxxx | 12bit |
| 543-1054 | 1 | 00 | Xxxxxxxx | 12bit |
| 1055-2078 | 1 | 01 | Xxxxxxxxx | 13bit |
| 2079-4126 | 1 | 10 | Xxxxxxxxxx | 14bit |
| 4127-8222 | 1 | 11 | Xxxxxxxxxxx | 15bit |
FIG. 7
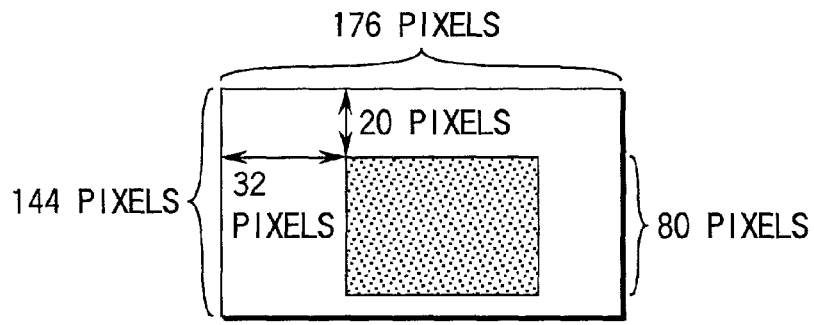
FIG. 8
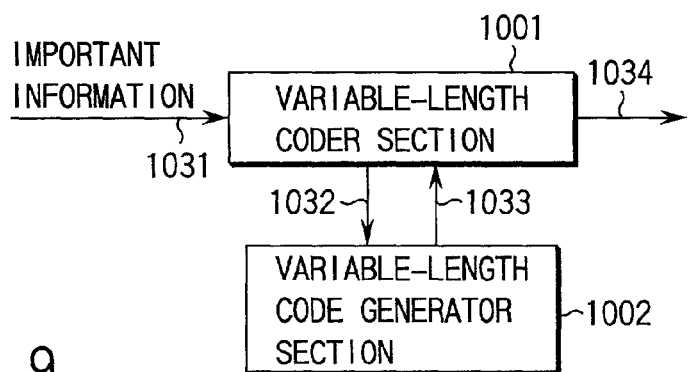
FIG. 9

PICTURE CANNOT BE DECODED OWING TO INFLUENCE OF ERROR

METHOD AND APPARATUS FOR CODING MOVING PICTURE IMAGE

TECHNICAL FIELD

The present invention relates to an information transmission scheme of transmitting a coded video picture/still picture using a cable communication network such as an ISDN (Integrated Services Digital Network) or Internet, or a radio communication network such as a PHS or satellite communication, and a coding/decoding apparatus in an information transmission system adopting this method.

BACKGROUND ART

Recently, with the advance of a digital coding technology and broadband network technology for various kinds of information such as a picture, applications using these technologies have extensively been developed. A system of transmitting a compression-coded picture and the like using a communication network is being developed.

For example, a videophone, teleconference system, and digital television broadcast adopt a technique of compressing and coding video pictures and speech into small information amounts, multiplexing the compressed video code stream, speech code stream, and another data code stream into one code stream, and transmitting and/or storing the code stream.

As a video signal compression-coding technique, techniques such as motion compensation, discrete cosine transform (DCT), subband coding, pyramid coding, and variable-length coding, and a scheme using a combination of them are developed. The video coding international standard scheme includes ISO MPEG-1 and MPEG-2, and ITU-T H.261, H.262, and H.263. The international standard scheme of multiplexing data and a code stream prepared by compressing video pictures and speech/audio signals includes an ISO MPEG system, and ITU-T H.221 and H.223.

In a conventional video coding scheme such as this video coding international standard scheme, coding is done in units of GOBs (Group Of Block) or macroblocks prepared by dividing a video signal into frames and dividing each frame into smaller regions. Then, pieces of header information representing a coding mode and the like are added to each frame, GOB, and macroblock. These pieces of header information are necessary to decode all the frames, GOBs, and the like.

If errors are mixed in header information in a transmission line/storage medium, and the header information cannot be normally decoded by a video coding apparatus, all the frames, GOBs, and the like including the header information cannot be normally decoded. The quality of a reconstructed video picture in the video decoding apparatus greatly degrades.

More specifically, in transmitting a compression-coded picture using a communication network, the receiving side must execute decoding processing of reconstructing significant information from a transmitted "0"/"1" bit stream.

For this purpose, the above-described header information is very important as information representing the rule of coding a set of predetermined bit steams. Examples of the header information are information representing the prediction type of frame being decoded (whether intraframe coding or interframe coding), time reference information representing the display timing of the frame, and step size information used in performing quantization.

If these pieces of header information are lost, image information transmitted subsequently cannot be normally decoded.

For example, assume that an error is mixed in a bit stream owing to any cause, and the bit pattern changes to represent intraframe coding though the prediction type of frame is supposed to represent interframe coding. In this case, even if subsequent actual information is normally transmitted, the decoding side determines the bit pattern as a result of intraframe coding, and hence cannot normally encode finally, sequentially transmitted information.

Consequently, the quality of a reconstructed video picture in the video coding apparatus greatly degrades.

Mixture of errors frequently occurs in a system, such as a radio videophone, portable information terminal, or radio digital television receiver, that transmits and/or stores a video picture via a radio transmission line.

The mainstream of conventional picture transmission is a system using a cable communication network. Even in the use of a radio communication network, picture transmission assumes satellite communication whose error rate is very low. In light of this, the structure of a coded stream to be transmitted does not sufficiently consider the error resilience, and important information such as header information is not satisfactorily protected against the transmission error.

In a PHS (Portable Handyphone System) expected to become one of the mainstreams of future mobile communication, the error rate is about several hundred thousand to million times that of satellite communication. Therefore, errors cannot be fully corrected only by conventional error protection or correction done for a coded bit stream.

In the Internet expected to become one of the mainstreams of future communication as well as the PHS, time at which an error is mixed and the type of mixed error are not statistically clarified, and no proper error correction may be done.

For this reason, in transmitting a code stream coded using arbitrary shape picture coding, the error resilience of transmission data weakens.

It can be attained by the present invention to make even in an arbitrary shape picture coding to have an error resilience similar to that in a conventional coding method for coding a rectangular picture.

DISCLOSURE OF INVENTION

The first invention provides a video coding apparatus comprising a coder unit for coding an input video picture to obtain a bit stream, an important information constructing unit for extracting, from coded information obtained by the coder unit, important information as information representing a rule of coding a set of predetermined bit streams, thereby constructing the important information, a sync code generator unit for generating a sync code, and a bit stream reconstructing unit for adding the sync code output from the sync code generator unit and the important information reconstructed by the important information constructing unit to the bit stream coded by the coder unit, thereby reconstructing the bit stream.

The second invention provides a picture coding apparatus wherein the important information constructing unit in the first invention comprises a conventional picture relating important information constructing unit for constructing, from the coded information, conventional picture relating information as important information in a conventional coding scheme of coding a frame in units of rectangular regions, an arbitrary shape picture relating important information constructing unit for constructing, from the coded information, arbitrary shape picture relating important information as important information in an arbitrary shape coding scheme of coding a picture in the frame in units of arbitrary shape picture regions, an arbitrary shape coding determination unit for determining based on the coded information whether the coded picture is an arbitrary shape picture, a switch unit for outputting the arbitrary shape picture relating important information when the arbitrary shape coding determination unit determines that the coded picture is an arbitrary shape picture, and a multiplexer unit for multiplexing the conventional picture relating information and an output from the switch unit.

The third invention provides a video decoding apparatus for decoding coded data including a bit stream including sync information that is obtained by coding a video picture, and includes, as header information, important information serving as information representing a rule of coding a set of predetermined bit streams, comprising a demultiplexer unit for demultiplexing an input bit stream into a picture bit stream, a decoder unit for decoding the picture bit stream, a sync code detector unit for detecting a sync code from the picture bit stream, and informing the decoder unit of the sync signal, an error check unit for checking presence of an error on the basis of decoded information of the decoder unit, and an important information constructing unit for constructing important information from header information output from the decoder unit, and informing the decoder unit of the important information when the error check unit determines absence of an error.

The fourth invention provides a video decoding apparatus wherein the important information constructing unit in the third invention comprises a conventional picture relating important information constructing unit for constructing conventional picture relating important information from the header information, an arbitrary shape coding determination unit for determining based on the header information whether a decoded picture is an arbitrary shape picture, an arbitrary shape picture relating important information constructing unit for constructing arbitrary shape picture relating important information from the header information, a first switch unit for inputting the header information to the arbitrary shape picture relating information reconstructing unit when the arbitrary shape coding determination unit determines that the decoded picture is an arbitrary shape picture, and a second switch unit for outputting the arbitrary shape picture relating important information when the arbitrary shape coding determination unit determines that the decoded picture is an arbitrary shape picture.

The fifth invention provides a video decoding apparatus comprising a coder unit for coding an input video picture to obtain a bit stream, an important information constructing unit for extracting, from coded information obtained by the coder unit, important information as information representing a rule of coding a set of predetermined bit streams, thereby constructing the important information, a bit stream divider unit for dividing the bit stream coded by the coder unit, a packet header generator unit for generating a packet header from the important information constructed by the important information constructing unit, and a packet structure unit for constructing a packet using the bit stream divided by the bit stream divider unit and the packet header generated by the packet header generator unit.

The sixth invention provides a video decoding apparatus wherein the important information constructing unit in the fifth invention comprises an arbitrary shape picture relating important information constructing unit for constructing arbitrary shape picture relating important information from the coded information, an expansion header insertion determining unit for determining based on the coded information whether an expansion header holding the arbitrary shape picture relating important information is inserted in the packet header, and a switch unit for inputting the header information to the arbitrary shape picture relating important information when the expansion header insertion determining unit determines that the expansion header is inserted.

The seventh invention provides a video decoding apparatus for decoding video picture coded data including a bit stream that is obtained by coding a video picture, and includes, as header information, important information serving as information representing a rule of coding a set of predetermined bit streams, the video decoding apparatus comprising a demultiplexer unit for demultiplexing an input bit stream into a picture bit stream and packet header information, a decoder unit for decoding the picture bit stream, an error check unit for checking presence of an error on the basis of decoded information of the decoder unit, and an important information constructing unit for extracting, from the packet header information, important information serving as information representing a rule of coding a set of predetermined bit streams, thereby constructing the important information, and when the error check unit determines presence of an error, and decoding requires important information, informing the decoder unit of the constructed important information.

The eighth invention provides a video decoding apparatus wherein the important information constructing unit in the seventh invention comprises an arbitrary shape picture relating important information constructing unit for constructing arbitrary shape picture relating important information from the packet header information, an expansion header insertion determining unit for determining based on the packet header information whether an expansion header is inserted in the packet header, and a switch unit for inputting the packet header information to the arbitrary shape picture relating important information when the expansion header insertion determining unit determines that the expansion header is inserted.

According to the present invention, in video coding, a header can be set in coded data. At the same time, an expansion header can be set in the header to include important information in the arbitrary shape picture coding scheme, in addition to important information in the conventional picture coding scheme that is stored in the header. Even if some headers are destroyed, a picture can be decoded at a portion having normal headers. Further, a sync code inserted in picture data can prevent out-of-synchronization of the video packet VP. The video packet VP is a packet starting from a sync code RM. Even if an error exists before RM to cause out-of-synchronization, this sync code RM can establish resynchronization.

Accordingly, the present invention can provide a video coding technique which attains high noise resilience in transmission and can give error resilience equivalent to that of conventional rectangular picture coding to even arbitrary shape picture coding.

BRIEF DESCRIPTION OF DRAWINGS

FIG. 7 is a table for explaining a coded word structure used in the present invention;

FIG. 8 is a view showing an example for explaining the effect of variable-length coding;

FIG. 9 is a block diagram showing an arrangement of performing variable-length coding for important information;

BEST MODE FOR CARRYING OUT OF THE INVENTION

Embodiments of the present invention will be described below with reference to the several views of the accompanying drawing.

The embodiments of the present invention will be described below with reference to the several views of the accompanying drawing.

Figure 1:
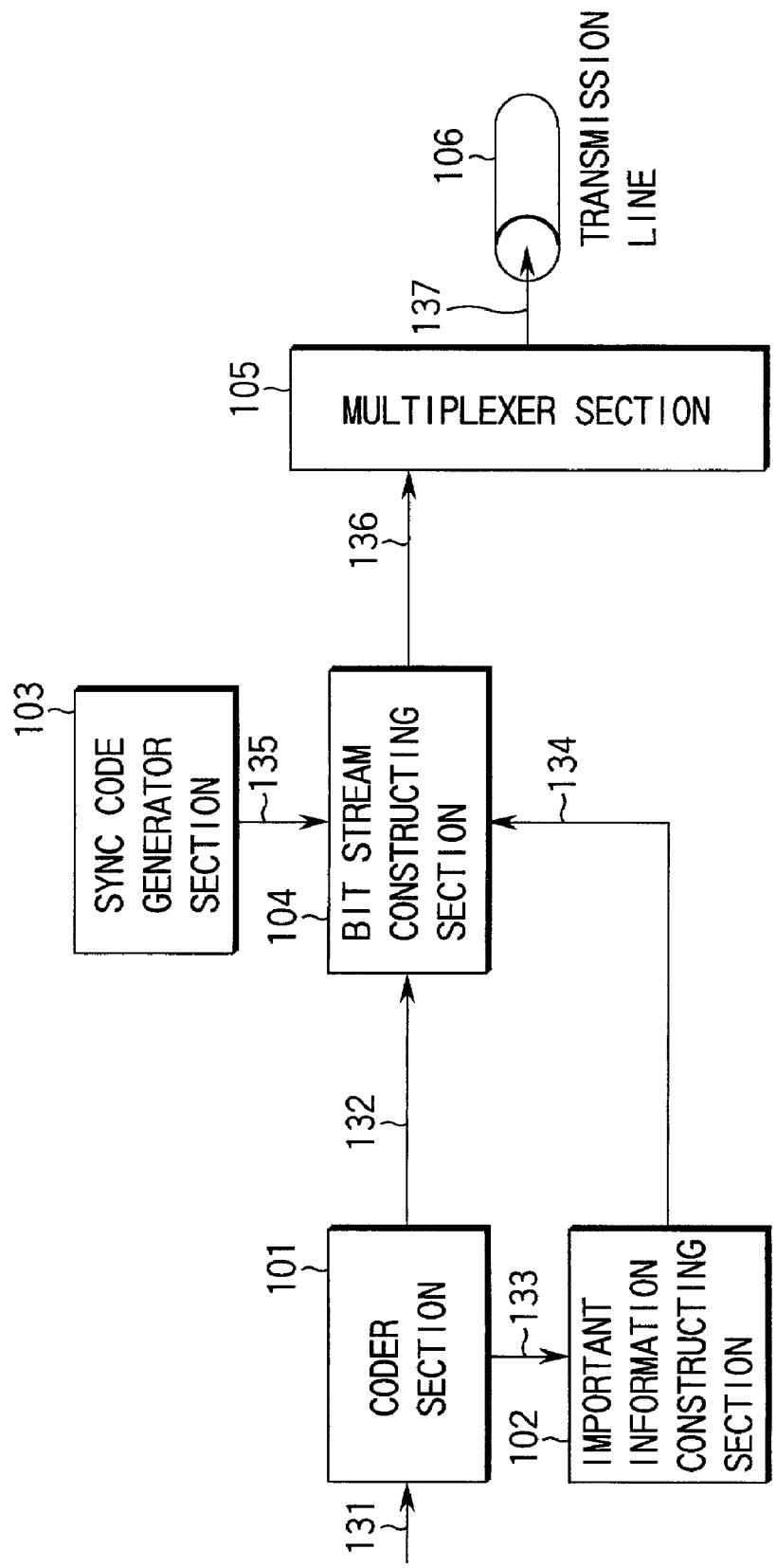
FIG. 1 is a block diagram showing the basic arrangement of a coder section according to the first embodiment of the present invention.

FIG. 1 shows the basic arrangement of a video coding apparatus according to the first embodiment of the present invention. In FIG. 1, the output of a coder section 101 is connected to an important information constructing section 102 and bit stream reconstructing section 104. The output of the important information constructing section 102 is connected to the bit stream reconstructing section 104 together with the output of a sync signal generator section 103. The output of the bit stream reconstructing section 104 is connected to a multiplexer section 105. The output of the multiplexer section 105 is a transmission line 106.

The coder section 101 codes an input video signal 131 to output it to the bit stream reconstructing section 104, and outputs coded information 133 obtained by coding to the important information constructing section 102. The important information constructing section 102 receives the video signal 131 obtained by coding in the coder section 101, and selects and outputs only important information 134 necessary for decoding.

The sync code generator section 103 generates a sync code 135 at an arbitrary interval. The bit stream reconstructing section 104 inserts the sync code 135 from the sync code generator section 103 in a bit stream 132. If necessary, the bit stream reconstructing section 104 inserts the important information 134 output from the important information constructing section 102 after the sync signal 135 in accordance with a predetermined format, and outputs the resultant bit stream.

The multiplexer section 105 multiplexes a bit stream 136 reconstructed by the bit stream reconstructing section 104 with another data (e.g., speech data, or bit stream prepared by coding another object) to output a multiplexed bit stream 137 to the transmission line/storage medium 106.

In this arrangement, the input video signal 131 is coded by the coder section 101. The bit stream 132 output from the coder section 101 upon coding is input to the bit stream reconstructing section 104. The coded information 133 obtained by coding in the coder section 101 is input to the important information constructing section 102, which selects and outputs only the important information 134 necessary for decoding.

The bit stream reconstructing section 104 inserts in the bit stream 132 the sync code 135 output from the sync code generator section 103 at an arbitrary interval. If necessary, the bit stream reconstructing section 104 inserts the important information 134 output from the important information constructing section 102 after the sync code 135 in accordance with a predetermined format.

The bit stream 136 reconstructed by the bit stream reconstructing section 104 is input to the multiplexer section 105 where the bit stream 136 is multiplexed with another data (e.g., speech data, or bit stream prepared by coding another object) to output the multiplexed bit stream 137 to the transmission line/storage medium 106.

According to the first embodiment, the sync code 135 output from the sync code generator section 103 at an arbitrary interval is inserted in a bit stream obtained by coding a video picture. If necessary, the important information 134 output from the important information constructing section 102 is inserted after the sync code 135 by the bit stream reconstructing section 104 in accordance with a predetermined format.

The important information constructing section 102 generates, as the important information 134, information necessary for arbitrary shape picture coding/decoding in MPEG-4, for example in arbitrary shape picture coding, information about the width VW of the picture size, information about the height VH, information about the x-coordinate VHMSR of the picture position for indicating the display position of a decoded picture, information about the y-coordinate VVMSR, the VOP shape coding type "vop_shape_coding_type (VSCT)" representing the coding mode of shape information, and the flag change_conv_ratio_disable (CCRD) representing whether coding is done after the size of shape information is converted. The pieces of important information are duplicated and inserted in a VP header by the bit stream reconstructing section 104 in accordance with a predetermined format, and then arbitrary shape picture coding can also attain error resilience equivalent to that of rectangular picture coding. Even if some VOP headers or VPs are destructed, a video picture can be decoded.

Figure 18:
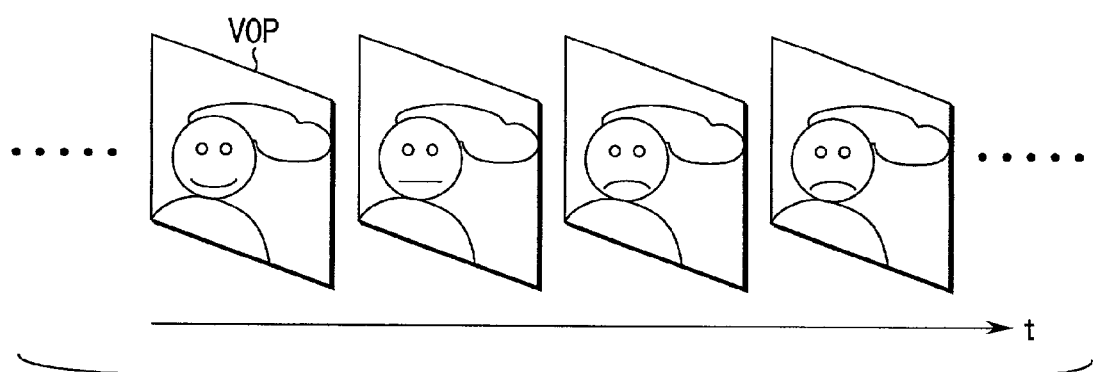
FIG. 18 is a view showing the VOP structure of MPEG-4.
Figure 19:
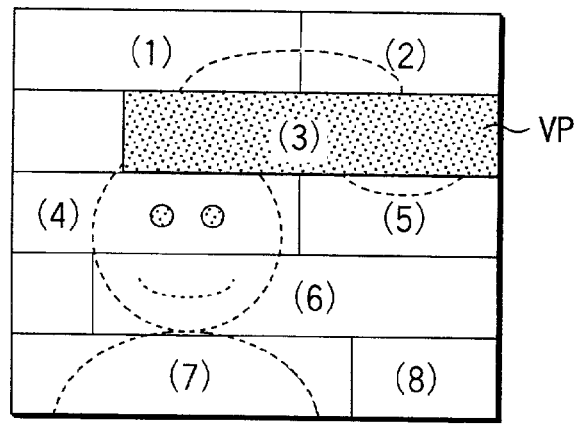
FIG. 19 is a view showing the VP structure of MPEG-4.

In MPEG-4, a video object plane "Video Object Plane" corresponds to the frame (FIG. 18). The Video Object Plane (to be referred to as VOP hereinafter) can be divided into a plurality of packets, and each packet is called a video packet "Video Packet" (FIG. 19).

The video packet "Video Packet" (to be referred to as VP hereinafter) is a packet starting from a sync code (Resync Marker; to be referred to as RM hereinafter). Even if an error exists before RM to cause out-of-synchronization, this sync code enabled resynchronization.

Figure 20:
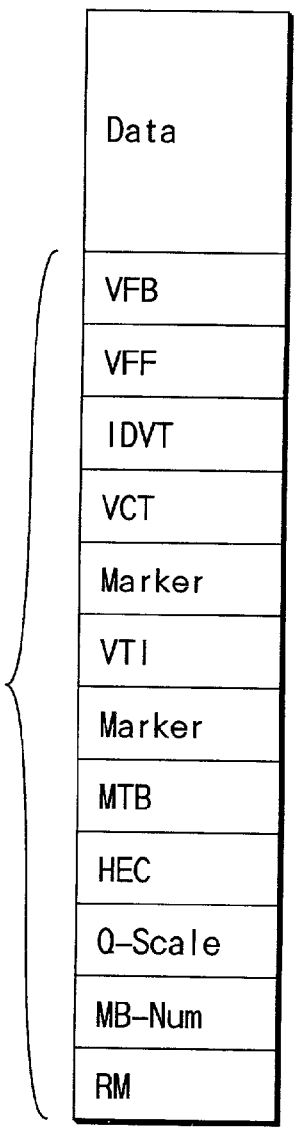
FIG. 20 is a view showing the VP header format of MPEG-4.

Even if, therefore, information is destroyed/lost by an error, subsequent video packets VP could be normally decoded so long as the video packets VP are not a start packet. This is because the start VOP header of the video object plane VOP has been decoded to provide all the pieces of information necessary for decoding (FIG. 20).

As described above, VOP header information includes the coding type (intraframe coding, interframe coding, and the like) of video object plane VOP, the time reference, and the step size. If this information is lost, all the video packets VP could not be decoded (FIGS. 21A and 21B).

In MPEG-4, the header extension code HEC is defined in the header of the video packet VP, and thus thereafter re-describing important information in the VOP header enabled based on the HEC value.

Figure 21A:
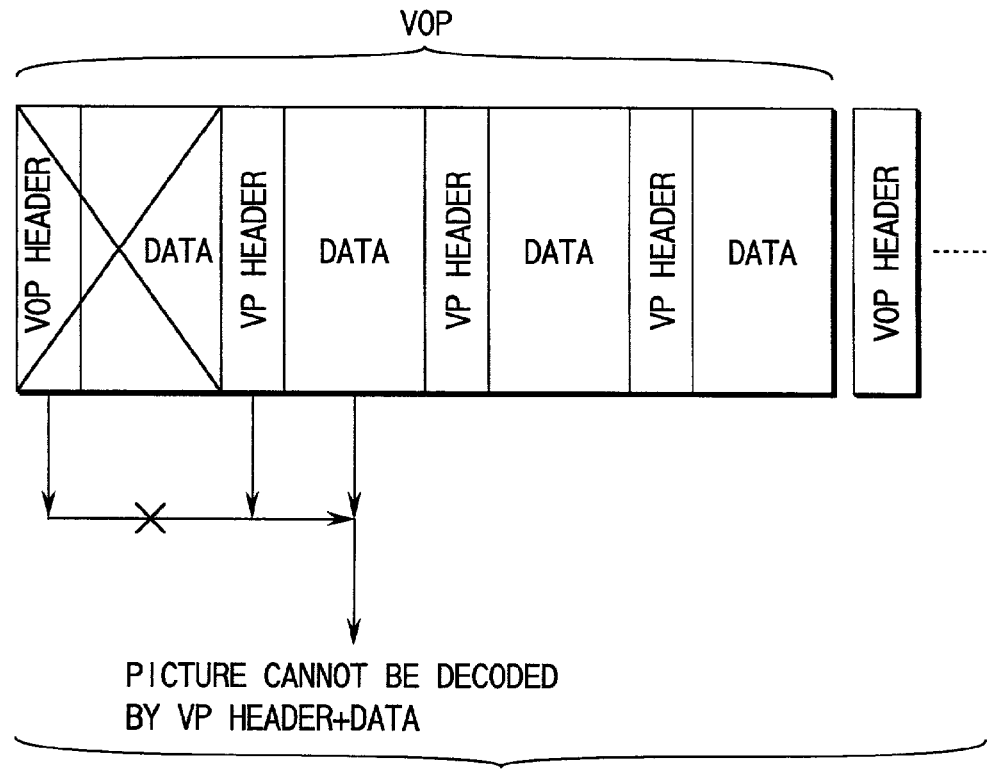
FIGS. 21A and 21B show the problem of conventional VP.
Figure 21B:
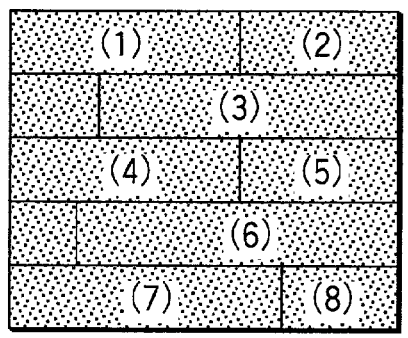

This format is shown in FIGS. 21A and 21B. As shown in FIG. 21A, the video object plane VOP was constructed with a format in which a pattern of a VOP header and subsequent data is set at the start, and a pattern of a video packet VP header and subsequent data is repeated several times.

The header extension code HEC is defined in the VP header, and important information in the VOP header is described again with the HEC value. Unless the video object plane VOP is destroyed, normal pairs of VP headers and data could be decoded using information of the VOP header and data even if one or two pairs of the headers of video packets VP and subsequent data are destroyed.

Figure 22A:
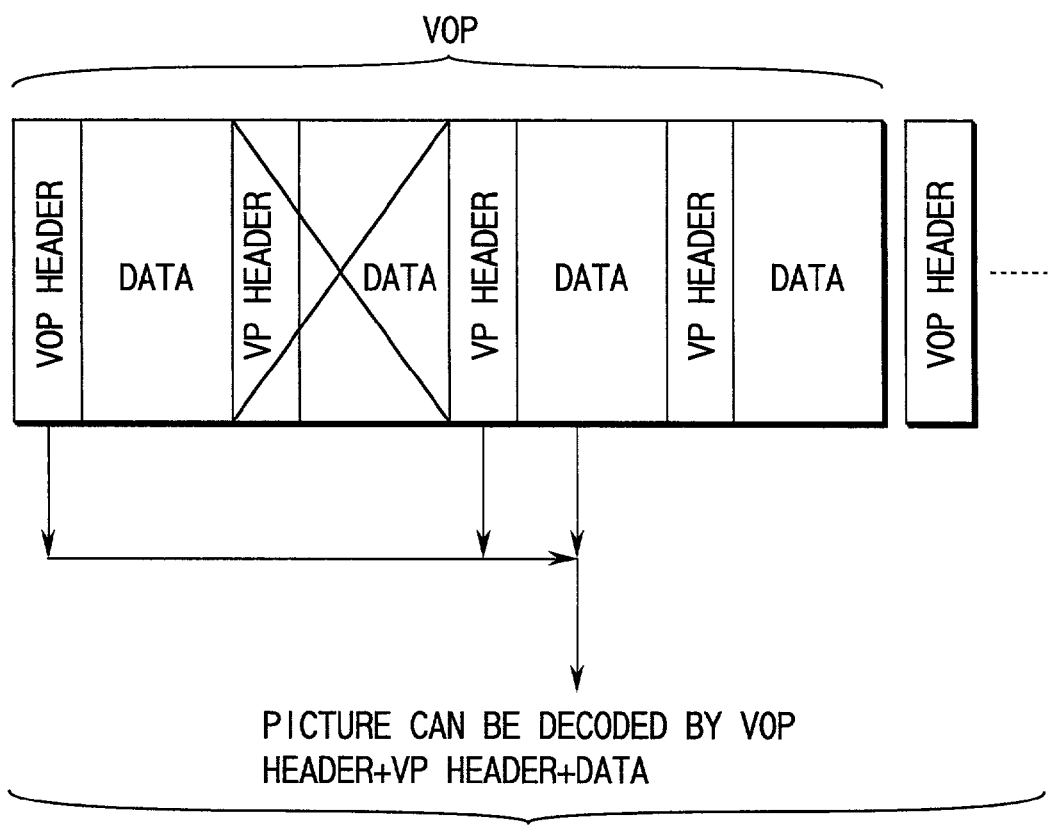
FIGS. 22A and 22B show the effect of conventional VP.
Figure 22B:
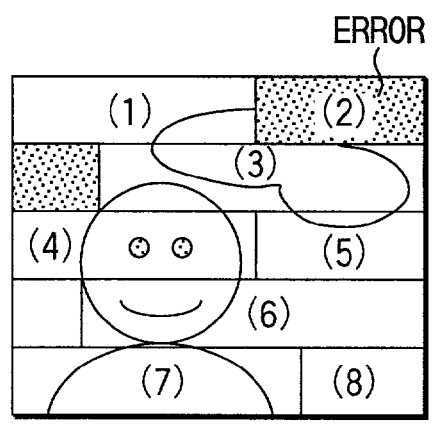

In the example of FIGS. 22A and 22B, the header of the video object plane VOP and its paired data are not destroyed, but only the header of the first video packet VP and its paired data are destroyed. In this case, the video object plane VOP and its data are not destroyed, as shown in FIG. 22B. Thus, the first region of a picture can be normally decoded. In the second region, an error occurs to decode a degraded picture. The third and subsequent regions of the picture are normally decoded. The picture could be decoded as one which is partially destroyed but almost completely reconstructed.

In MPEG-4, header extension code HEC is defined in the header of the video packet VP so as not to make the entire image be in a decode disable state even in the case of FIGS. 21A and 21B, thereby enabling important information included in the VOP header to be described in accordance with the HEC information.

Figure 23A:
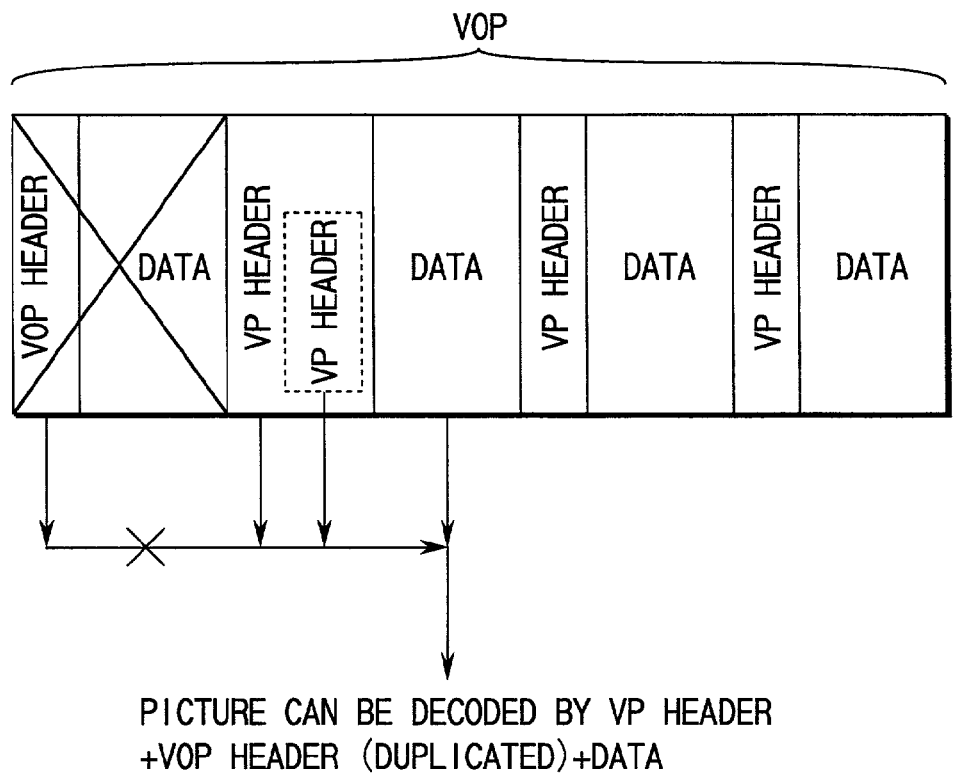
FIGS. 23A and 23B show the effect of VP using HEC.
Figure 23B:
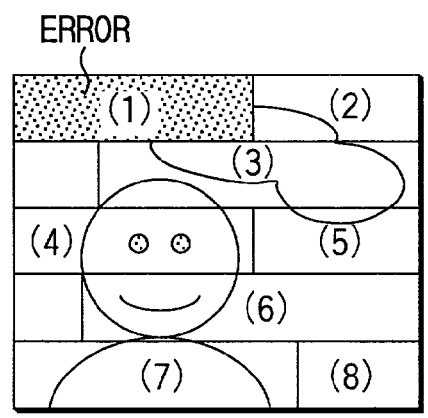

Even if an error exists at the start of VOP to fail in decoding, as shown in FIG. 23A, information protected by HEC can be used to decode video packets VP in the second and subsequent regions though the picture of the start region cannot be normally decoded. The picture can be decoded as one which is partially destroyed but almost completely reconstructed can be decoded, as shown in FIG. 23B.

However, this could only be realized in units of rectangular picture regions. More specifically, VOP header information is duplicated in the VP header using HEC. Even when the VOP header is lost, subsequent data can be normally decoded using the VOP header so long as the VOP header is duplicated in the VP header using HEC. However, information which can be duplicated using HEC does not include any information necessary for arbitrary shape picture coding. Although a conventional rectangular picture can be decoded without any problem, a scheme such as MPEG-4 capable of coding an arbitrary shape picture in units of objects could not decode any picture.

Arbitrary shape picture coding in units of objects in MEPG-4 uses a larger number of pieces of header information than in rectangular picture coding. For this reason, it was problems that header information cannot be duplicated.

From another viewpoint, as the Internet, intranet, and the like are becoming popular, these networks are often used for communication. Also, Internet videophones and the like are being used. In this case, a video picture is transmitted in real time. However, a video picture transmitted in real time via the Internet, intranet, or the like poses many problems in generally used TCP and UDP protocols. A serious problem is that the header does not have any time information.

To prevent this, an RTP (Real-time Transfer Protcol) recently receives a great deal of attention as a protocol used to transmit video picture/speech data. That is, a protocol such as TCP does not have any time information to each packet, so the receiving side cannot obtain the time when received data is reconstructed. When data is transmitted in units of packets, the receiving side cannot satisfactorily reconstruct video picture data or speech/sound data.

However, RTP adds time information to each packet to allow the receiving side to reconstruct video picture data and speech/sound data based on the time information. In this manner, RTP is suitable for real-time data transmission.

This protocol can define an expansion header for each application.

MPEG-4 duplicates VOP header information in a VP header using HEC. Even if the VOP header is lost, subsequent data could be normally decoded using the VOP header as far as the VOP header is duplicated in the VP header using HEC.

However, information which can be duplicated using HEC does not include any information necessary for arbitrary shape picture coding. A conventional rectangular picture can be decoded without any problem. To the contrary, arbitrary shape picture coding uses a larger number of pieces of header information than in rectangular picture coding. Hence, it was serious problems that header information cannot be duplicated.

Figure 24:
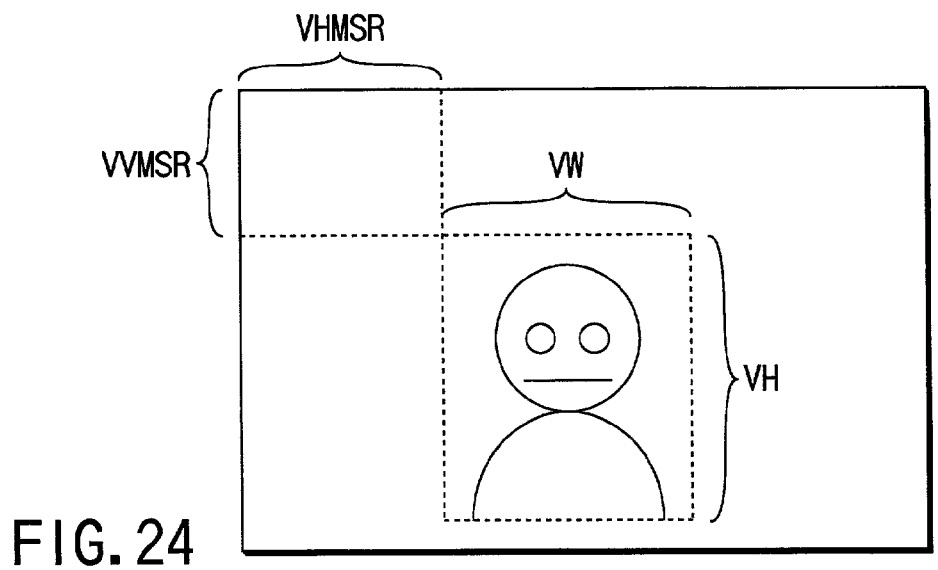
FIG. 24 is a view showing information necessary for synthesizing and playing back pictures in decoding an arbitrary shape picture.

For example, since the picture size changes in units of VOPs in arbitrary shape picture coding, a width vop_width (to be referred to as VW hereinafter) and a height vop_height (to be referred to as VH hereinafter) of the picture size are described in the VOP header. Also, an x-coordinate vop_horizontal_mc_spatial_ref (to be referred to as VHMSR hereinafter) and a y-coordinate vop_vertical_mc_spatial_ref (to be referred to as VVMSR hereinafter) of the picture position for indicating the display position of a decided picture are described. The relationship between these values is shown in FIG. 24.

When a video picture is to be decoded using only information of the video packet VP without these pieces of information, a picture cannot be normally decoded in arbitrary shape picture coding. In other words, a picture could not be normally decoded in arbitrary shape picture coding without information about the width VW of the picture size, information about the height VH, information about the x-coordinate VHMSR of the picture position for indicating the display position of a decoded picture, and information about the y-coordinate VVMSR.

Normally coding a picture also requires a VOP shape coding type "vop_shape_coding_type (to be referred to as VSCT hereinafter) representing the coding mode of shape information, and a flag change_conv_ratio_disable (to be referred to as CCRD hereinafter) representing whether coding is done after the size of shape information is converted.

These pieces of information are not protected in duplication of the VOP header using HEC in MPEG-4.

Accordingly, when transmitting a stream of codes encoded using arbitrary shape picture coding, the error resilience of transmission data is weakened disadvantageously. The present invention enables data transmitted using arbitrary shape picture coding to have an error resilience equal to that obtained using conventional rectangular picture coding.

In this fashion, the system can give error resilience equivalent to that of conventional rectangular picture coding to even arbitrary shape picture coding. The important information constructing section 102 and bit stream reconstructing section 104 as important features of the present invention in the above arrangement will be described in detail with reference to FIG. 2.

The important information constructing section 102 will be explained in detail.

Figure 2:
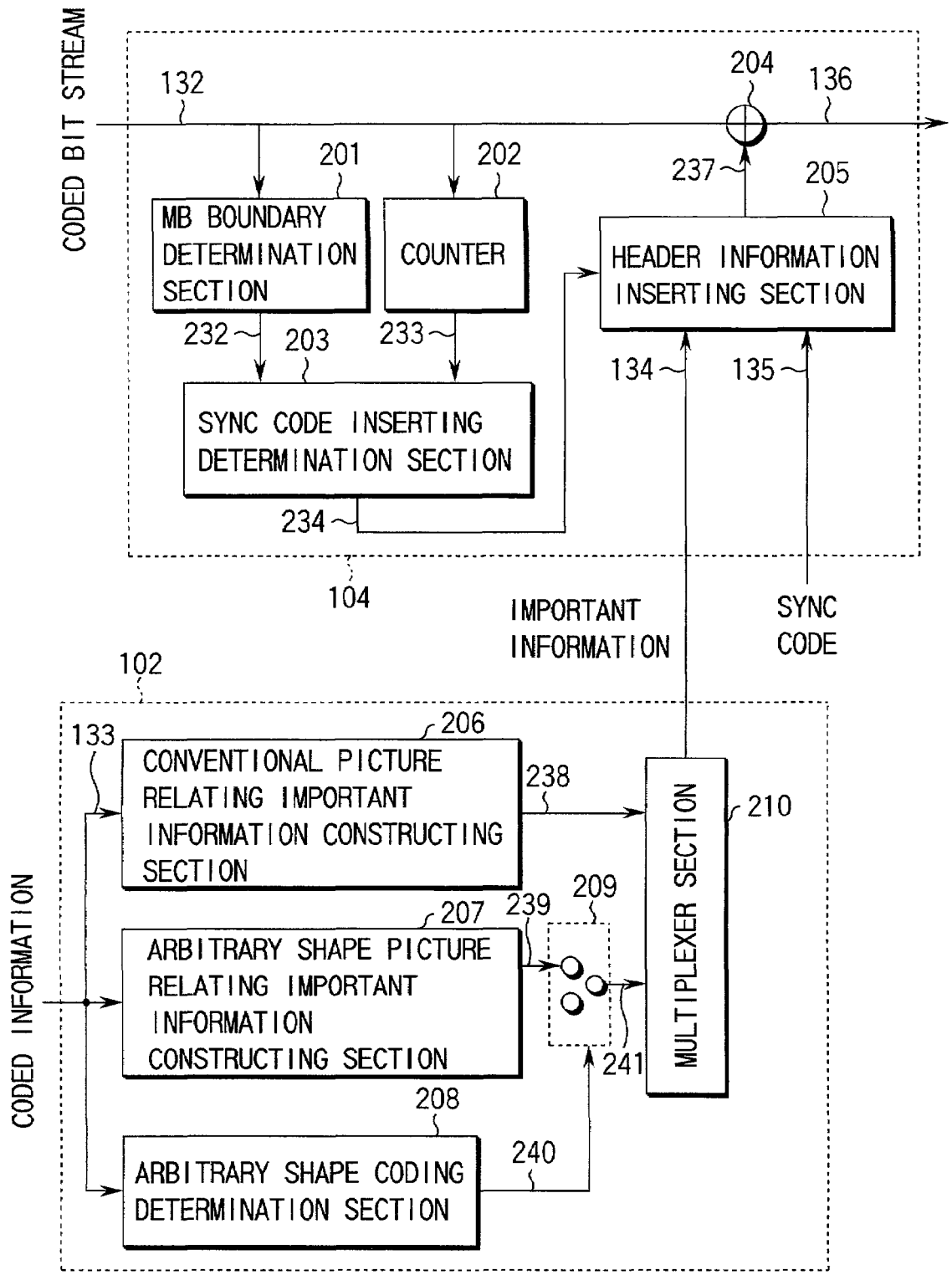
FIG. 2 is a block diagram showing in detail the basic arrangements of an important information constructing section and bit stream reconstructing section in the coder section according to the first embodiment of the present invention.

As shown in FIG. 2, the important information constructing section 102 is constituted by a conventional picture relating important information constructing section 206, arbitrary shape picture relating important information constructing section 207, arbitrary shape coding determination section 208, and multiplexer section 210.

Of these sections, the conventional picture relating important information constructing section 206 receives the coded information 133 from the coder section 101, selects information (e.g., coding mode information and time reference information) determined to be important based on the coded information 133 in conventional coding, and outputs the information as conventional picture relating important information 238 to the multiplexer section 210. The arbitrary shape picture relating important information constructing section 207 selects important information (e.g., picture size, position, coding mode, and a size change mode) relating to arbitrary shape picture coding, and outputs the information as arbitrary shape picture relating important information 239.

The arbitrary shape coding determination section 208 determines whether a coded picture is a conventional rectangular picture or arbitrary shape picture, and outputs the determination result as a determination signal 240.

A switch section 209 executes switch control of determining based on the determination signal 240 from the arbitrary shape coding determination section 208 whether the arbitrary shape picture relating important information 239 from the arbitrary shape picture relating important information constructing section 207 is output to the multiplexer section 210. The multiplexer section 210 multiplexes the conventional picture relating important information 238 from the conventional picture relating important information constructing section 206, and the arbitrary shape picture relating important information 239 output from the arbitrary shape coding determination section 208 in arbitrary shape picture coding, and outputs the multiplexed information as the important information 134.

In this arrangement, the coded information 133 from the coder section 101 is input to the conventional picture relating important information constructing section 206 as a construction component of the important information constructing section 102. The conventional picture relating important information constructing section 206 selects information (e.g., coding mode information and time reference information) determined to be important in conventional coding, and outputs the selected information as the conventional picture relating important information 238 to the multiplexer section 210. As a result, the conventional picture relating important information 238 is a set of pieces of information such as the coding mode information and time reference information determined to be important in general coding.

Then, the arbitrary shape picture relating important information constructing section 207 selects important information (e.g., picture size, position, coding mode, and a size change ratio) relating to arbitrary shape picture coding, and outputs the selected information as arbitrary shape picture relating important information 238 to the multiplexer section 210.

The arbitrary shape coding determination section 208 determines whether a coded picture is a conventional rectangular picture or arbitrary shape picture, and outputs the determination result as the determination code 240. This determination signal 240 controls the switch section 209 which performs switch control of determining whether the arbitrary shape picture relating important information 239 from the arbitrary shape relating important information constructing section 207 is output. The multiplexer section 210 multiplexes the conventional picture relating important information 238 and arbitrary shape picture relating important information 239 in arbitrary shape picture coding, and outputs the multiplexed information as the important information 134.

As a result, the conventional picture relating important information 238 and arbitrary shape picture relating important information 239 in arbitrary shape picture coding can be output as the multiplexed important information 134 from the multiplexer section 210. In conventional picture coding, the conventional picture relating important information 238 can be output as the important information 134.

The bit stream reconstructing section 104 will be described in detail. As shown in the upper half of FIG. 2, the bit stream reconstructing section 104 is comprised of an MB boundary determination section 201, counter 202, sync code inserting determination section 203, header information inserting section 205, and adder section 204.

Of these sections, the MB boundary determination section 201 determines whether or not data of the bit stream 132 from the coder section 101 corresponds to the boundary of the macroblock MB. The number-of-coded-bits counter section 202 counts the number of coded bits of the bit stream 132 supplied from the preceding coder section 101.

When the MB boundary determination section 201 determines that the bit stream 132 corresponds to an MB boundary, and the count value of the number-of-coded-bits counter section 202 for the bit stream 132 exceeds a given value, the sync code inserting determination section 203 outputs an insertion permission signal 234.

The header information inserting section 205 prepares header information from the input important information 134 and sync code 135. When the sync signal inserting determination section 203 determines that insertion is permitted, the header information inserting section 205 outputs header information 237 prepared for the coded bit stream 132 to the adder section 204.

The adder section 204 adds the bit stream 132 supplied from the coder section 101 to header information 237 of the header information inserting section 205, and outputs the addition result as the reconstructed bit stream 136 of the bit stream reconstructing section 104.

When the bit stream reconstructing section 104 receives the bit stream 132 coded by the coder section 101, the bit stream 132 is input to the MB boundary determination section 201 and the number-of-coded-bits counter section 202. The MB boundary determination section 201 determines whether the input bit stream 132 corresponds to an MB boundary.

The number-of-coded-bits counter section 202 counts the number of coded bits of the bit stream 132. When the MB boundary determination section 201 determines that the bit stream 132 corresponds to an MB boundary, and the number of coded bits counted by the counter 202 exceeds a given value, the sync code inserting determination section 203 generates the insertion permission signal 234 to output it to the header information inserting section 205.

The header information inserting section 205 prepares header information from the input important information 134 and sync signal 135, and outputs the prepared header information 237 to the adder section 206 in order to add the header information 237 to the coded bit stream 132. The adder section 204 inserts the header information 237 in the coded bit stream 132 to output the reconstructed bit stream 136. This bit stream 136 is output from the bit stream reconstructing section 104.

As a result, if the number of coded bits exceeds a predetermined value when it has been detected, by examining the bit stream 132 of image data from the coder section 101, that a bit indicative of the boundary position of the macroblock MB has reached, the insertion permission signal 234 is generated. Header information created by the header information inserting section 205 on the basis of the input important information 134 and the sync code 135 can be added to the bit stream 132.

In the important information constructing section 102, the conventional picture relating important information constructing section 206 (e.g., coding mode information and time reference information) determined to be important in conventional coding based on the coded information 133 from the coder section 101, and outputs the selected information as the conventional picture relating important information 238. The arbitrary shape picture relating important information constructing section 207 selects important information (e.g., picture size, position, coding mode, and a size change ratio) relating to arbitrary shape picture coding, and outputs the selected information as the arbitrary shape picture relating important information 239. The conventional picture relating important information 238 is used for conventional picture coding. The conventional picture relating important information 238 and arbitrary shape picture relating important information 239 are multiplexed when an arbitrary shape picture is coded. Therefore, header information inserted in a bit stream can include conventional picture relating important information and arbitrary shape picture relating important information. The VP header can include information necessary to play back a conventional picture and arbitrary shape picture of MPEG-4 coded data.

Figure 3:
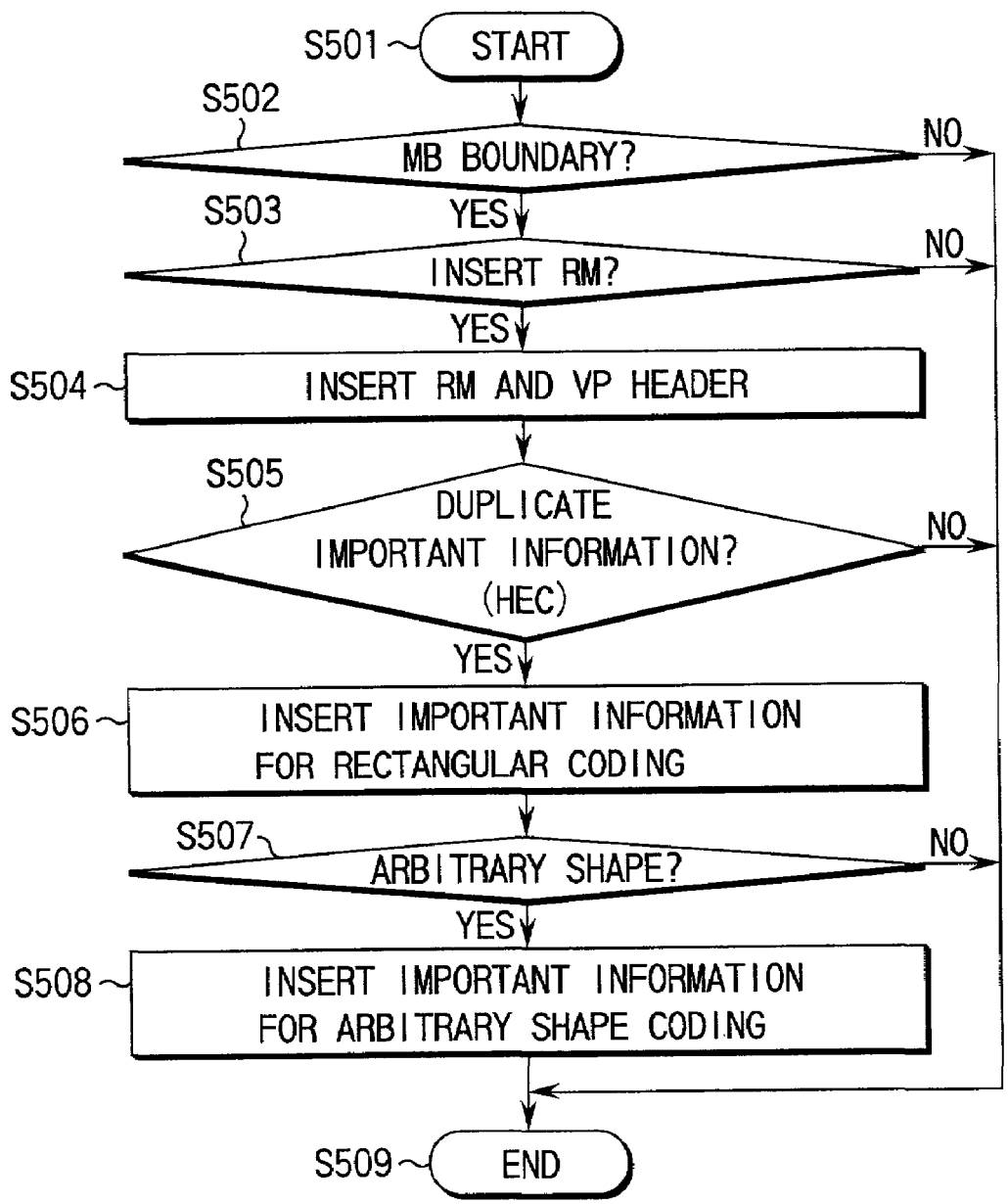
FIG. 3 is a flow chart showing the basic flow of the bit stream reconstructing section according to the first embodiment of the present invention.

FIG. 3 is a flow chart showing preparation of header information.

As the first step (step S502), the bit stream reconstructing section 104 determines whether a bit stream of the coder section 101 corresponds to the boundary position of MB (MacroBlock).

If Y in step S502, whether a sync code RM is to be inserted is determined as the second step (step S503). This determination step can be done based on an arbitrary algorithm of the user.

For example, various methods can be adopted: an algorithm of inserting the sync code RM when the number of bits after a preceding sync code exceeds a predetermined value, or an algorithm of determining whether RM is inserted along a picture configuration when the number of MBs after a preceding sync signal exceeds a predetermined value.

The video packet VP starts from the sync signal RM. Even if an error exists before the sync code RM to cause out-of-synchronization, this sync code RM can establish resynchronization.

If Y in step S503, RM is inserted, and a VP header subsequent to RM is inserted (step S504 in FIG. 3).

In the third step (step S505), whether important information of the VOP header is duplicated as an expansion header information is determined.

If Y in step S505, HEC is true, and important information in rectangular picture coding is selected and output from the VOP header (step S506 in FIG. 3).

In the fourth step (step S507), whether the picture is an arbitrary shape picture is determined. If Y in step S507, important information in arbitrary shape picture coding within the VOP header is selected and output (step S508 in FIG. 3).

The VP header is generated through the four steps, and inserted in a bit stream.

Figure 4:
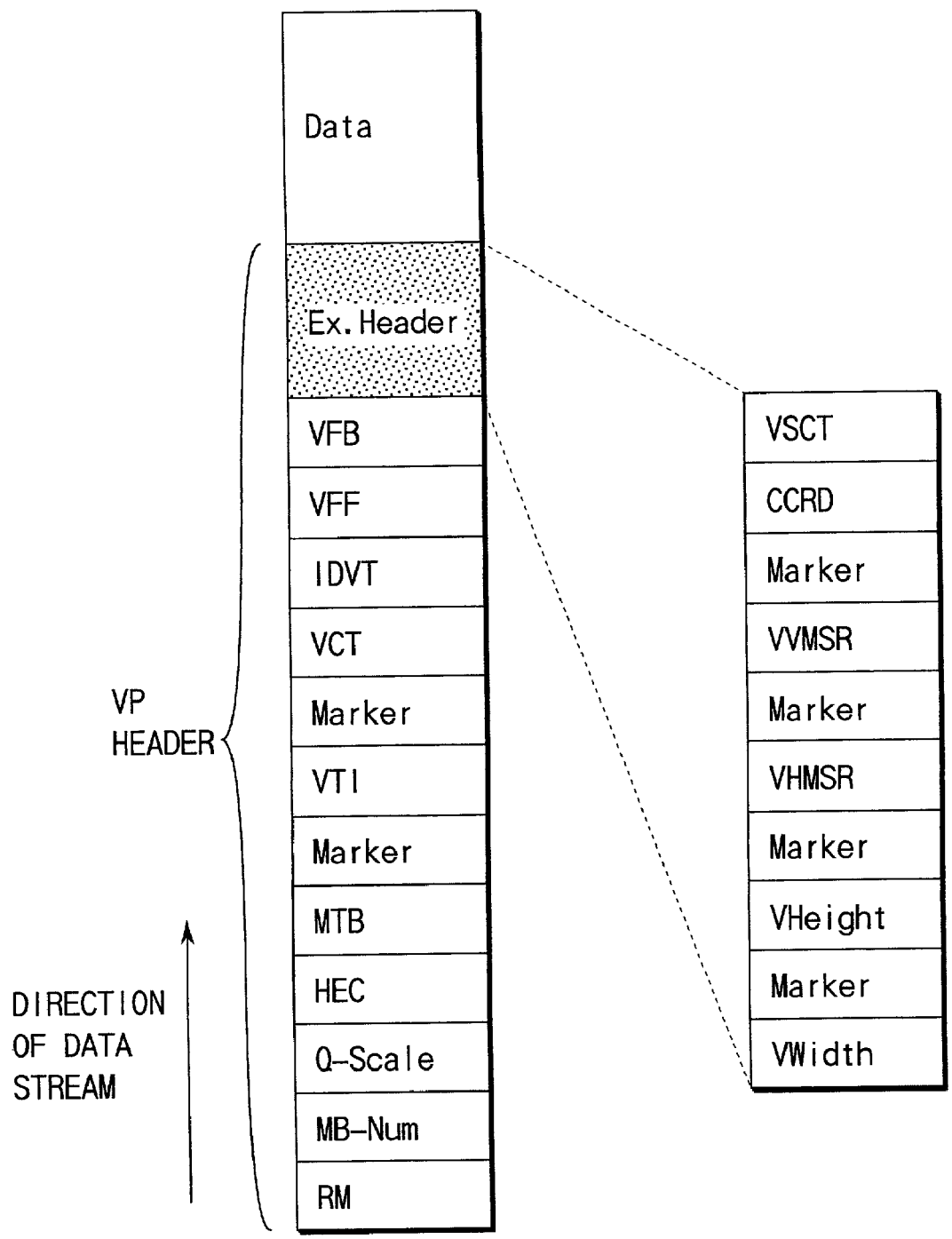
FIG. 4 is a view showing the expansion header format of VP according to the first embodiment of the present invention.

FIG. 4 shows a structure of a VP header information in an arbitrary shape picture. An expansion header information Ex-Header is added to the conventional VP header information shown in FIG. 20. This expansion header information Ex-Header additionally includes important information in arbitrary shape picture coding, i.e., the width (VW) and height (VH) of a picture, an x-coordinate (VHMSR) and y-coordinate (VVMSR) at which the picture is pasted, a flag (CCRD) representing whether shape information is reduced and coded, and information (VSCT) about the coding type (intraframe coding, interframe coding, or the like) of picture information.

Note that important information in arbitrary shape picture coding is not limited to the above information. Depending on an application purpose, another information can be added, or information can be reduced. However, the transmitting and receiving sides must have consensus on the header format.

The video coding apparatus comprises the function of extracting important information in arbitrary shape picture coding, the function of determining whether an arbitrary shape picture coding is used, and the function of detecting the boundary of a macroblock. The VP header includes extension header information. This extension header information includes, as well as a sync code, important information in conventional picture coding, and important information for arbitrary shape picture coding in arbitrary shape picture coding. Even if some headers are destroyed, a picture can be decoded at a portion having normal headers. Further, the sync code prevents out-of-synchronization of the video packet VP. That is, even if out-of-synchronization occurs, the video packet VP can establish resynchronization using the sync code RM.

Accordingly, the first embodiment can provide a video coding technique which attains high noise resilience in transmission and can give error resilience equivalent to that of conventional rectangular picture coding to even arbitrary shape picture coding.

The arrangement and processing on the coding side has been explained in detail. Next, the arrangement and processing on the decoding side will be explained in detail.

The decoder section will be described. In the decoder section according to the first embodiment shown in FIG. 5, a demultiplexer section 302 is connected to a decoder section 303 and sync detector section 304. The output of the sync detector section 304 is connected to the decoder section 303. The decoder section 303 is connected to an error check section 305. The error check section 305 is connected to the output of the decoder section 303 and an important information constructing section 306. The important information constructing section 306 is connected to the decoder section 303.

The demultiplexer section 302 demultiplexes a bit stream 331 received from the transmission line/storage medium 106 into a picture bit stream 332 and another data. The sync detector section 304 detects the sync code RM from the bit stream 332 output from the demultiplexer section 302. The decoder section 303 decodes the picture bit stream 332 output, and generates picture data. At this time, the decoder section 303 executes decoding processing in synchronism with a sync code detected by the sync detector section 304.

The important information constructing section 306 obtains data being decoded by the decoder section 303. If VOP (Video Object Plane) being decoded by the decoder section 303 includes a VOP header, the important information constructing section 306 extracts information of the VOP header, and outputs it to the decoder section 303.

The error check section 305 checks decoded information 334 output from the decoder section 303 to detect whether an error occurs during decoding operation. If an error is detected, the error check section 305 informs the important information constructing section 306 of generation of the error in decoding processing so as to stop outputting important information to the decoder section 303.

If an error occurs, the decoder section 303 performs processing corresponding to the error. After processing corresponding to the error, the decoder section 303 again performs decoding operation from the position of a next sync code detected by the sync detector section 304.

In this arrangement, the bit stream 331 received from the transmission line/storage medium 106 is demultiplexed into the picture bit stream 332 and another data by the demultiplexer section 302. This another data is transmitted to a corresponding decoder section.

The picture bit stream 332 demultiplexed by the demultiplexer section 302 is input to the decoder section 303 where the bit stream 332 is decoded. During decoding processing, a sync code is detected from the bit stream 332 by the sync code detector section 304.

The error check section 305 checks whether an error occurs during decoding operation, from the decoded information 334 obtained by decoding processing of the decoder section 303. If an error is detected, processing corresponding to the error is executed by the decoder section 303, and decoding operation is done at the position of a next sync code detected by the sync detector section 304.

The decoder section 303 determines the type of next sync code. If the signal is the sync signal RM, and an error signal 335 is true, the decoder section 303 obtains VOP header information 343 from the important information constructing section 306.

When a VOP header exists in VOP (Video Object Plane) being decoded by the decoder section 303, the important information constructing section 306 outputs information of the VOP header; and when no VOP header exists in VOP being decoded, the important information constructing section 306 outputs important information so long as the important information is inserted by header extension code HEC within the VP header.

Decoding processing in the decoder section 303 uses important information obtained by the important information constructing section 306. If a VOP header exists in VOP (Video Object Plane) being decoded by the decoder section 303 in the important information obtained by the important information constructing section 306, the information of the VOP header is output; and if no VOP header exists in VOP being decoded, important information is output as far as the important information is inserted by HEC (Header Extension Code) within the VP header. On the coding side, important information includes not only important information in conventional picture coding but also important information in arbitrary shape picture coding. Even if some headers are destroyed, a picture can be decoded from data having normal headers regardless of whether the data is obtained by coding a conventional picture or arbitrary shape picture. Further, the sync code prevents out-of-synchronization of the video packet VP. That is, even if out-of-synchronization occurs, the video packet VP can establish resynchronization using the sync code RM.

Accordingly, the first embodiment can provide the decoding technique of a video coding technique which attains high noise resilience in transmission and can give error resilience equivalent to that of conventional rectangular picture coding to even arbitrary shape picture coding.

According to this technique, the noise resilience in transmission is attained by transmitting, as header information, not only important information in conventional picture coding but also important information for arbitrary shape picture coding in arbitrary shape picture coding. On the receiving side, it is important how to extract the important information, transmit it to the decoder section 303, and use the important information for decoding processing.

The feature of the first embodiment is, therefore, the important information constructing section 306. The important information constructing section 306 will be described in detail with reference to FIG. 6.

Figure 6:
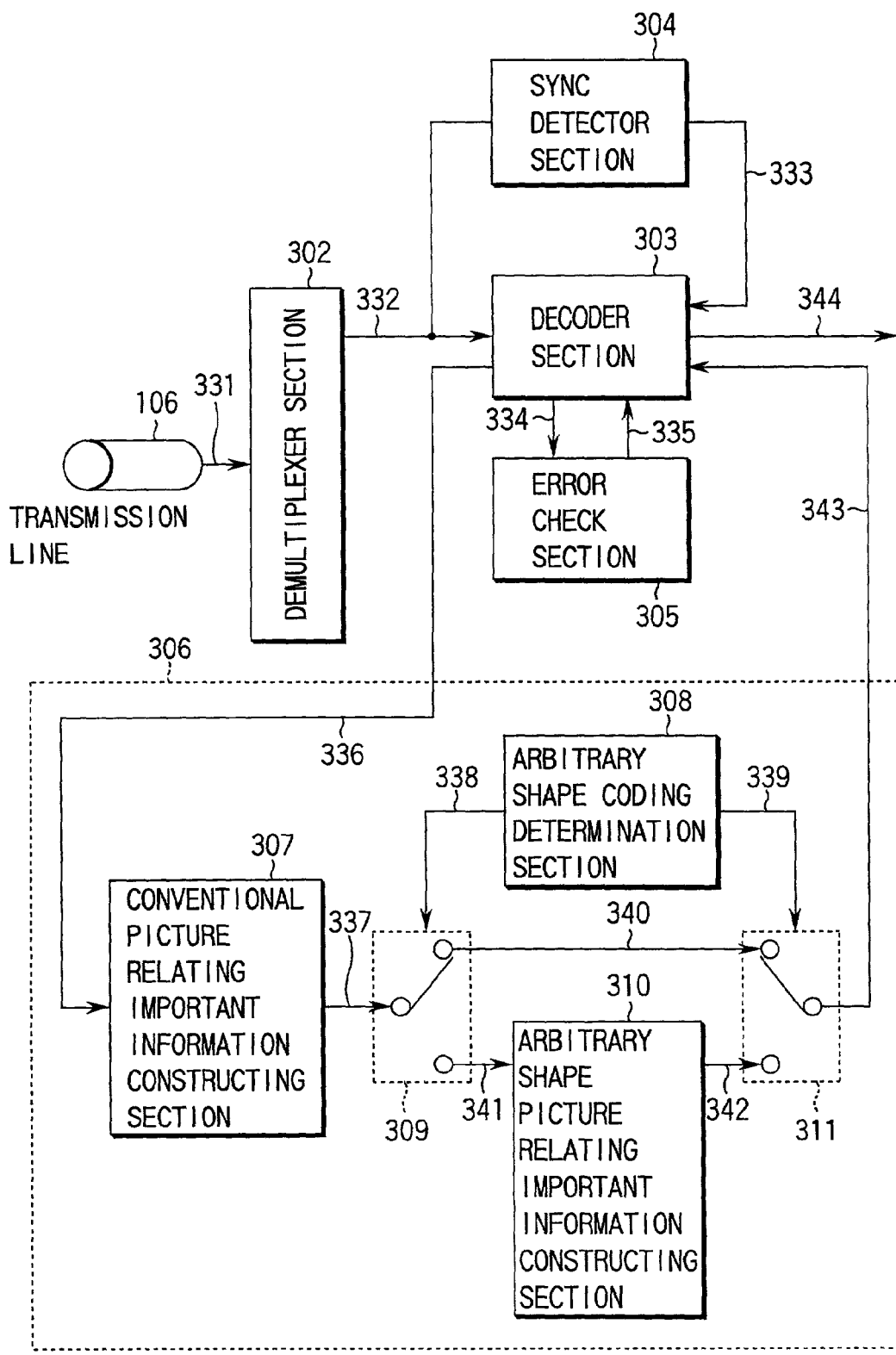
FIG. 6 is a block diagram showing in detail the basic arrangement of an important information constructing section in the decoder section according to the first embodiment of the present invention.

As shown in FIG. 6, the important information constructing section 306 comprises a conventional picture relating important information constructing section 307, arbitrary shape coding determination section 308, switch sections 309 and 311, and arbitrary shape picture relating important information constructing section 310.

When a VP header is detected in the decoder section 303, the conventional picture relating important information constructing section 307 decodes coding mode information, time reference information, and the like in information of the VP header, and outputs the decoded information.

The arbitrary shape coding determination section 308 determines whether a picture being decoded by the decoder section 303 is an arbitrary shape picture or conventional rectangular picture. The switch sections 309 and 311 are switched in accordance with the determination result. The switch sections 309 and 311 are system switches for two sections.

The arbitrary shape picture relating important information constructing section 310 decodes important information (e.g., picture size and picture position) relating to an arbitrary shape picture. For an arbitrary shape picture, the switch sections 309 and 311 are switched to be connected to the arbitrary shape picture relating important information constructing section 310. Then, important information relating to the arbitrary shape picture is reconstructed, and supplied to the decoder section 303 in addition to important information relating to a conventional picture from the conventional picture relating important information constructing section 307. Thus, the decoder section 303 can also decode the arbitrary shape picture.

In the important information constructing section 306 having this arrangement, when the decoder section 303 detects a VP header in an input bit stream, the conventional picture relating important information constructing section 307 decodes coding mode information, time reference information, and the like.

The arbitrary shape coding determination section 308 determines whether a picture being decoded by the decoder section 303 is an arbitrary shape picture or conventional rectangular picture, and generates a control signal corresponding to the determination result.

The control signal from the arbitrary shape coding determination section 308 controls the switch sections 309 and 311. For an arbitrary shape picture, the arbitrary shape picture relating important information constructing section 310 decodes important information (e.g., picture size and picture position) relating to the arbitrary shape picture, prepares the final important information 343, and supplies it to the decoder section 303 as an output from the important information constructing section 306. As far as an expansion header is set in a header, and includes important information relating to an arbitrary shape picture, the decoding side can extract the important information to supply the important information necessary for decoding the arbitrary shape picture to the decoder section 303.

In this manner, the first embodiment can give error resilience equivalent to that of conventional rectangular picture coding to even arbitrary shape picture coding.

In the first embodiment and the second embodiment (to be described later), "picture size" and "position information" must be described in arbitrary shape picture coding. Each of these pieces of information is expressed by 13 bits in MPEG-4, each of "picture size" and "position information" requires horizontal information and vertical information, and thus 4×13 bits=52 bits are required. These bits may be large redundant data in transmission at a low bit rate. For this reason, the data is transmitted after being compressed as much as possible. This method will be described.

The size of the video object plane VOP or the like is expressed by 13 bits in MEPG-4. In many cases, however, all the 13 bits are not used. From this, a method of expressing the size by a variable length and decreasing the number of bits will be considered.

Basically, the size is expressed by a pair of "coded word length"+"value". As shown in FIG. 7, a header portion representing the code length and a subsequent data portion are combined. More specifically, a header "header 1" and header "header 2" are used. The former is made of 1 bit, whereas the latter is made of 3 bits. The value ranges from 1 to 542. The coded word length is made of 5 bits for the values "1" and "2", 6 bits for the values "3" to "6", and 7 bits for the values "7" to "14". The coded word length is made of 8 bits for the values "15" to "30", 9 bits for the values "31" to "94", and 10 bits for the values "95" to "158". The coded word length is made of 11 bits for the values "159" to "286", and 12 bits for the values "287" to "542". From the values "543" to "8222", the header "header 1" is made of 1 bit, whereas the header "header 2" is made of 2 bits. The coded word length is made of 12 bits for the values "543" to "1054", 13 bits for the values "1055" to "2078", 14 bits for the values "2029" to "4126", and 15 bits for the values "4127" to "8222".

With this setting, the word length is not fixed to 13 bits, but can change from 5 bits to 15 bits depending on the numerical value. As a result, the number of bits even including the header can be decreased to 18 bits at maximum, which is smaller by 34 bits than the conventional 52 bits.

In general, a small picture often requires coding at a low bit rate. A large picture, which has a large-size bit stream, often has a margin at a high bit rate. Also in this sense, it is effective to set a variable code length and assign a short code to a small size.

For example, when a presentation layer "Presentation Layer" is a QCIF (176 pixels×144 pixels) picture, the maximum VW and VH are 11 [bits]×2=22 [bits]

The maximum position information (VHMSR and VVMSR) is

11 [bits]×2=22 [bits]

The sum of them is 44 [bits], and thus data can be compressed by 8 [bits].

Moreover, in a picture structure as shown in FIG. 8,

VW=128 pixels=10 [bits]

VH=80 pixels=9 [bits]

VHMSR=32 pixels=9 [bits]

VVMSR=20 pixels=8 [bits]

The sum of them is

10+9+8+9=36 [bits]

Consequently, 16 [bits] can be reduced.

FIG. 9 shows the basic arrangement of a modification to the first embodiment. In FIG. 9, reference numeral 1001 denotes a variable-length coder section; and 1002, a variable-length code generator section. The variable-length code generator section 1002 receives size information to convert it into a coded word. The variable-length coder section 1001 reads size information from input important information 1031 to output size information 1032 to the variable-length code generator section 1002. At the same time, the variable-length coder section 1001 outputs a coded word 1033 obtained by the variable-length code generator section 1002 as a coded word 1034.

When important information 1031 is input in this arrangement, it is input to the variable-length coder section 1001. The variable-length coder section 1001 reads size information from the input important information 1031 to send the size information 1032 to the variable-length code generator section 1002 which generates the coded word 1033.

The variable-length coder section 1001 outputs the coded word 1034 obtained by performing size information conversion to the coded word 1033 received from the variable-length code generator section 1002.

The first embodiment has exemplified MPEG-4. However, as for transmission of arbitrary shape coding other than MPEG-4, the error resilience can be improved by adding similar information.

Another embodiment will be described as the second embodiment.

Figure 10:
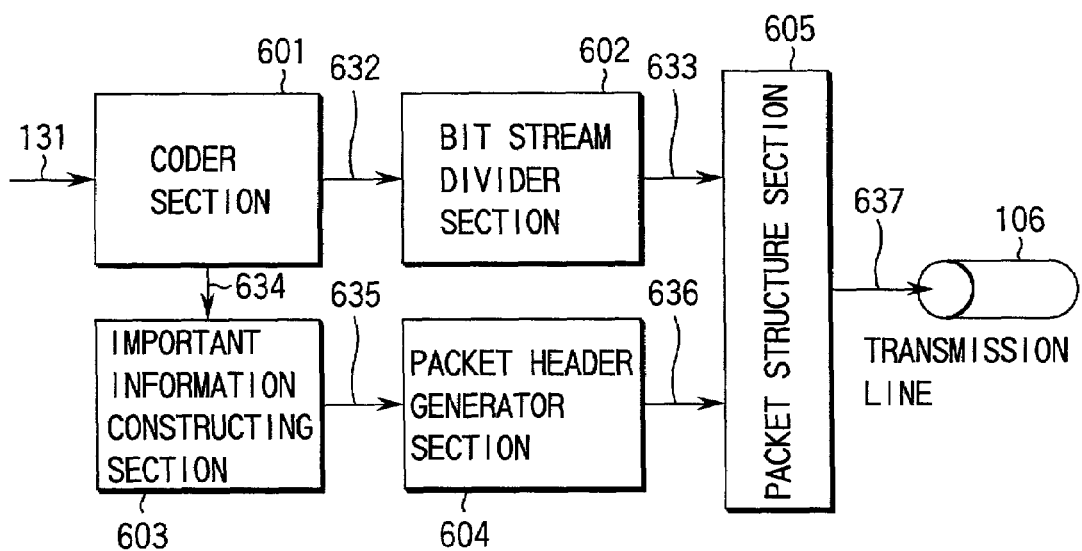
FIG. 10 is a block diagram showing the basic arrangement of a coder section according to the second embodiment of the present invention.

FIG. 10 is a block diagram showing the basic arrangement of a video coding apparatus according to the second embodiment of the present invention. In the video coding apparatus according shown in FIG. 10, the output of a coder section 601 is connected to a bit stream divider section 602 and important information constructing section 603. The output of the important information constructing section 603 is connected to a packet header generator section 604. The outputs of the bit stream divider section 602 and packet header generator section are connected to a packet structure section 605. The output of the packet structure section 605 is connected to a transmission line 106.

The coder section 601 codes an input video signal 131 to output it to the bit stream divider section 602, and outputs coded information 634 obtained by coding to the important information constructing section 102.

The important information constructing section 102 receives the coded information 634 obtained by coding by the coder section 101, and selects and outputs only important information 635 necessary for decoding. In particular, the important information constructing section 102 acquires, as the important information 635, not only conventional picture relating important information but also arbitrary shape picture relating important information such as information necessary for arbitrary shape picture coding/decoding in MPEG-4, e.g., in arbitrary shape picture coding, information about the width VW of the picture size, information about the height VH, information about the x-coordinate VHMSR of the picture position for indicating the display position of a decoded picture, information about the y-coordinate VVMSR, VOP shape coding type "vop_shape_coding_type (VSCT)" representing the coding mode of shape information, and a flag change_conv_ratio_disable (CCRD) representing whether coding is done after the size of shape information is converted. The important information 635 is output to the packet header generator section 604. The packet header generator section 604 reflects conventional picture relating important information on a packet header in a general manner. As for arbitrary shape picture relating important information, the packet header generator section 604 generates a packet header in a unique format to the present invention which is reflected with a predetermined format in an expansion header newly set in the packet header.

The packet header generator section 604 inserts the important information 635 in the packet header to form a packet header 636, and outputs the packet header 636 to the packet structure section 605. The bit stream divider section 602 divides a bit stream 632 output from the coder section 601 into packets, and outputs them.

The packet structure section 605 multiplexes a divided bit stream 633 output from the bit stream divider section 602, and the packet header 636 output from the packet header generator section 604, and outputs obtained multiplexed data 637 to the transmission line/storage medium 106.

In this arrangement, the video signal 131 of an input video picture is coded by the coder section 601. Then, the coder section 601 outputs the coded information 634 obtained by coding to the important information constructing section 603. The important information constructing section 603 selects only the important information 635 necessary for decoding from the input coded information 634, and outputs the important information 635. In the packet header generator section 604, the important information 635 is inserted in a packet header, and output as the packet header 636.

The bit stream divider section 602 divides the bit stream 632 output from the coder section 601 into packets. The packet structure section 605 multiplexes the divided bit stream 633 output from the bit stream divider section 602, and the packet header 636 output from the packet header generator section 604, and outputs the multiplexed data 637 to the transmission line/storage medium 106.

According to the second embodiment, the important information 635 output from the bit stream divider section 602 is inserted by the packet header generator section 604 with a predetermined format in the header of a bit stream obtained by coding a video picture. The important information 635 is added to coded data of the video picture, packeted, and transmitted.

The packet header has an expansion header which is used to store and transmit important information other than conventional picture relating important information.

As important information other than conventional picture relating important information, the important information 635 includes information necessary for arbitrary shape picture coding/decoding in MPEG-4, e.g., in arbitrary shape picture coding, information about the width VW of the picture size, information about the height VH, information about the x-coordinate VHMSR of the picture position for indicating the display position of a decoded picture, information about the y-coordinate VVMSR, VOP shape coding type "vop_shape coding_type (VSCT)" representing the coding mode of shape information, and a flag change_conv_ratio_disable (CCRD) representing whether coding is done after the size of shape information is converted. This important information 635 is inserted as an expansion header in a packet header with a predetermined format by the packet header generator section 604. If the decoder is constituted to execute decoding processing using information extracted from the expansion header of the packet, the decoder can reconstruct an arbitrary shape picture in units of packets. Even arbitrary shape picture coding can attain error resilience equivalent to that of conventional rectangular picture coding. Even if some VOP headers or VPs are destroyed, a video picture can be decoded.

In this fashion, this system can give error resilience equivalent to that of conventional rectangular picture coding even to arbitrary shape picture coding. The important information constructing section 60 as the important component of the present invention in the above arrangement will be described in detail with reference to FIG. 11.

Figure 11:
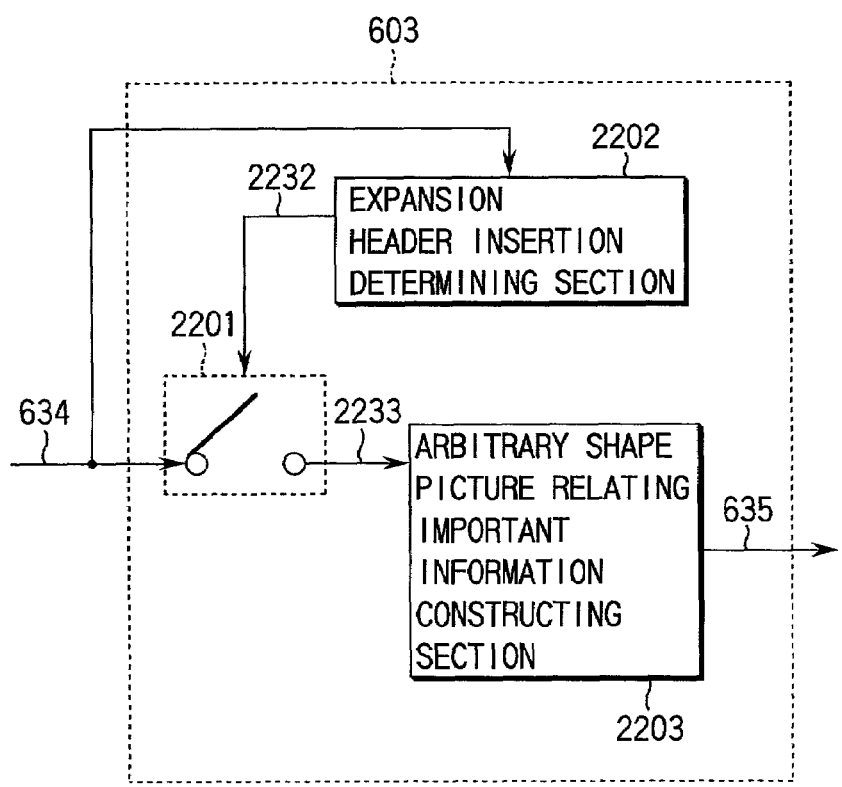
FIG. 11 is a block diagram showing the detailed arrangement of an important information constructing section in the coder section according to the second embodiment of the present invention.

FIG. 11 is a block diagram showing the important information constructing section 603. The important information constructing section 603 is an important point in the second embodiment. As shown in FIG. 11, the important information constructing section 603 comprises a switch section 2201, expansion header insertion determining section 2202, and arbitrary shape picture relating important information constructing section 2203.

The expansion header insertion determining section 2202 determines whether an expansion header is added to a packet header. The expansion header insertion determining section 2202 determines based on the coded information 634 input from the coder section 601 whether the coder section 601 executes arbitrary shape picture coding. If the coder section 601 executes arbitrary shape picture coding, the expansion header insertion determining section 2202 adds an expansion header to a packet header.

The switch section 2201 is a section opening/closing switch. When the expansion header insertion determining section 2202 determines to add an expansion header to a packet header, the switch section 2201 closes a section to input the coded information 634 from the coder section 601 to the arbitrary shape picture relating important information constructing section 2203 in accordance with a control signal output from the expansion header insertion determining section 2202.

The arbitrary shape picture relating important information constructing section 2203 receives as input coded information 2233 the coded information 634 input via the switch section 2201. Based on the coded information 634, the arbitrary shape picture relating important information constructing section 2203 selects VOP header information relating to arbitrary shape coding, and outputs it as the important information 635.

In this arrangement, the expansion header insertion determining section 2202 determines whether an expansion header is added to a packet header, on the basis of the coded information 634 input from the coder section 601 to the important information constructing section 603. If the expansion header insertion determining section 2202 determines that an expansion header is added to a packet header, the switch section 2201 inputs the input coded information 2233 to the arbitrary shape picture relating important information constructing section 2203. The arbitrary shape picture relating important information constructing section 2203 selects VOP header information relating to arbitrary shape coding from the input coded information 2233, and outputs the important information 635.

Insertion of important information in a packet header will be explained in detail below.

Figure 12:
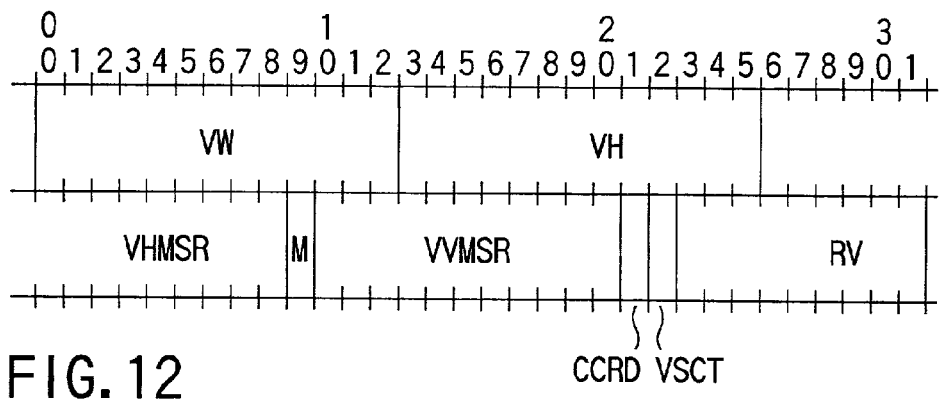
FIG. 12 is a view showing an example of an expansion packet header according to the second embodiment of the present invention.

Compared to rectangular picture coding, arbitrary shape picture coding requires the picture width (VW) and height (VH), the x-coordinate (VHMSR) and y-coordinate (VVMSR) for arranging a picture, a flag (CCRD) representing whether shape information is reduced and coded, and a shape information coding mode (VSCT). In addition, the important information may include information such as a flag (VCA) and value (VCAV) for keeping the a value constant in a blending, and a flag (VRT) representing a rounding method for keeping coding and decoding calculation precisions equal to each other. In this embodiment, however, VW, VH, VHMSR, VVMSR, CCRD, and VSCT are inserted. FIG. 12 shows the format of the expansion header of a packet header in this case. In FIG. 12, each figure represents the number of bits, and one horizontal line represents 32 bits. In MEPG-4, VW, VH, VHMSR, and VVMSR are expressed by 13 bits each, and CCED and VSCT are expressed by 1 bit each.

Figure 13:
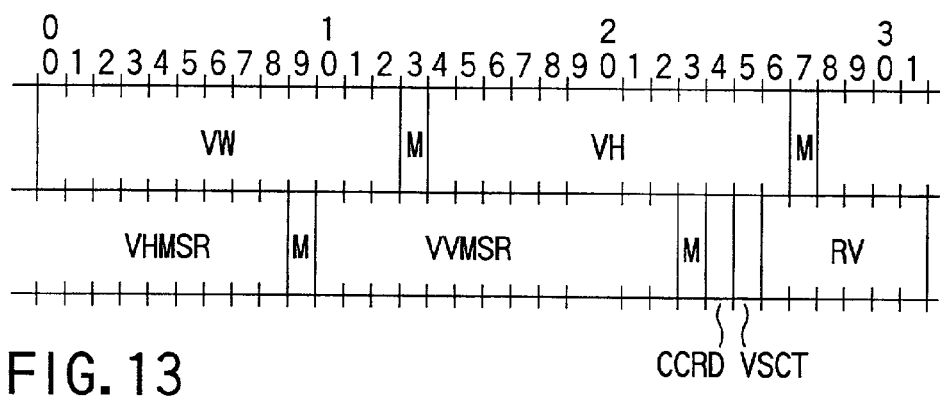
FIG. 13 is a view showing another example of the expansion packet header (with a marker) according to the second embodiment of the present invention.

Herein, a reserve "Reserve" bit (RV) is inserted at last in order to align information into 32 bits. If VW, VH, and the like may successively appear like a bit stream such as a sync code, for example, markers (M) may be inserted between respective values to prevent forming a bit stream like a sync code which must not appear, as shown in FIG. 13. The position of the marker M is not limited to the boundary between pieces of information, and may be inserted at any position so long as the same rule is established between the transmitting and receiving sides.

A flag representing the presence of an expansion header must finally be inserted in conventional header information. Thus, 1-bit information representing whether an expansion header exists in a conventional header is inserted. These formats are merely examples. Alternatively, header information can be formed from only some of these data or a combination with another information.

According to the second embodiment, in coding and packetting a video picture, an expansion header can be added to a packet header for inserting conventional picture relating important information. When an arbitrary shape picture is to be coded and transmitted, its arbitrary shape picture relating important information is inserted in the expansion header, added as a packet header to data, and packetted. Hence, an arbitrary shape picture can be reconstructed in units of packets. Even arbitrary shape picture coding can attain error resilience equivalent to that of conventional rectangular picture coding. Even if some VOP headers or VPs are destroyed, a video picture can be decoded.

An example of a decoder section for decoding this packet will be described.

An arrangement of the decoder section will be explained. In the decoder section shown in FIG. 14, the output of a demultiplexing section 702 for receiving a coded bit stream is connected to a decoder section 703 and important information construction section 705. The output of the decoder section 703 is connected to the important information construction section 705 via an error check section 704. The output of the important information construction section 705 is connected to the decoder section 703. The demultiplexing section 702 performs demultiplexing for a bit stream 731 input from the transmission line/storage medium 106 into a picture bit stream 732, packet header 735, and another data.

The decoder section 703 decodes the demultiplexed picture bit stream 732 using important information from the important information construction section 705, thereby obtaining original picture data. The error check section 704 checks whether an error occurs during decoding processing, on the basis of decoded information 733 obtained by the decoder section 703.

The important information construction section 705 reconstructs important information from information of the packet header 735 demultiplexed by the demultiplexing section 702, and outputs the reconstructed information to the decoder section 703.

In this arrangement, the bit stream 731 input from the transmission line/storage medium 106 is demultiplexed by the demultiplexing section 702 into the picture bit stream 732, packet header 735, and another data. This another data is transmitted to a corresponding decoder section. The demultiplexed picture bit stream 732 is input to the decoder section 703 where the bit stream 732 is decoded. The decoder section 703 performs decoding processing for the demultiplexed picture bit stream 732 using important information from the important information construction section 705.

The error check section 704 checks whether an error occurs during decoding processing, from the decoded information 733 from the decoder section 703. If an error is detected as a result of the check, the important information construction section 705 reconstructs important information 736 present in the packet header 735. Using the important information 736, the decoder section 703 starts decoding a coded bit stream.

In coding and packetting a video picture, this system can add an expansion header to a packet header for inserting conventional picture relating important information. When an arbitrary shape picture is to be coded and transmitted, a packet header having arbitrary shape picture relating important information inserted in the expansion header is added to data. Since a video picture is packetted in this way, arbitrary shape picture relating important information can be acquired from the expansion header to decode an arbitrary shape picture.

The important information construction section 705 as an important component in the third embodiment will be described in detail with reference to FIG. 15.

Figure 15:
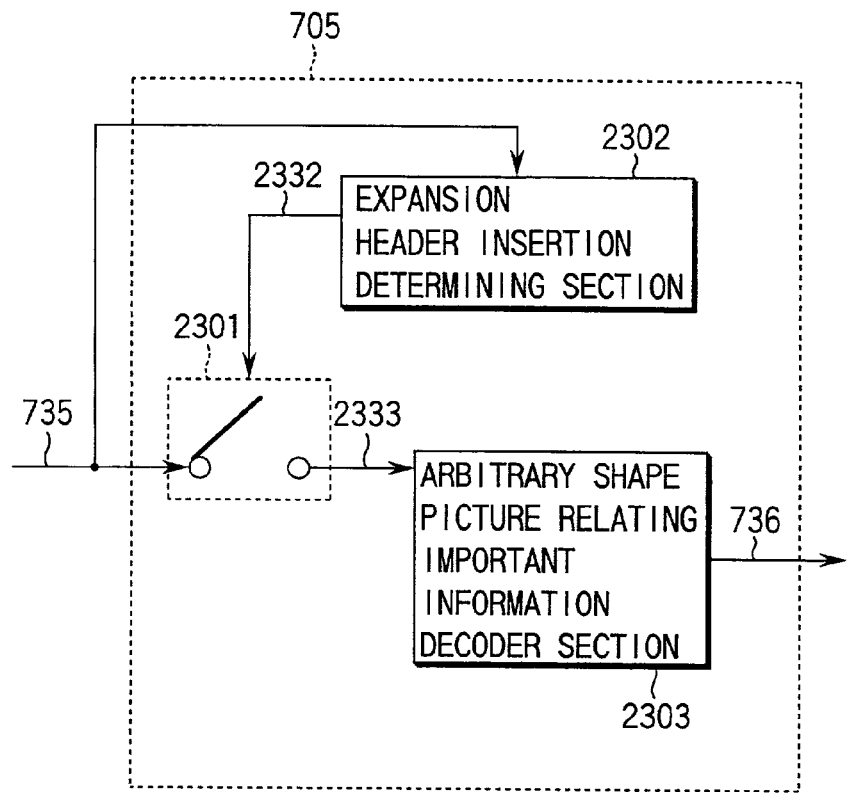
FIG. 15 is a block diagram showing the detailed arrangement of an important information construction section in the decoder section according to the second embodiment of the present invention.
Figure 16:
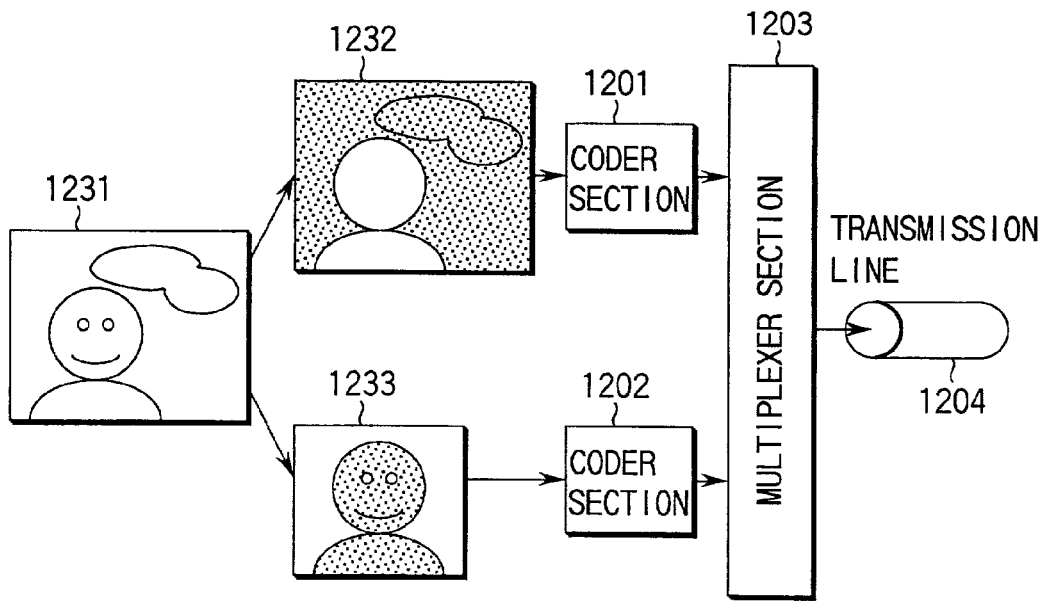
FIG. 16 is a view for explaining coding of an arbitrary shape picture.
Figure 17:
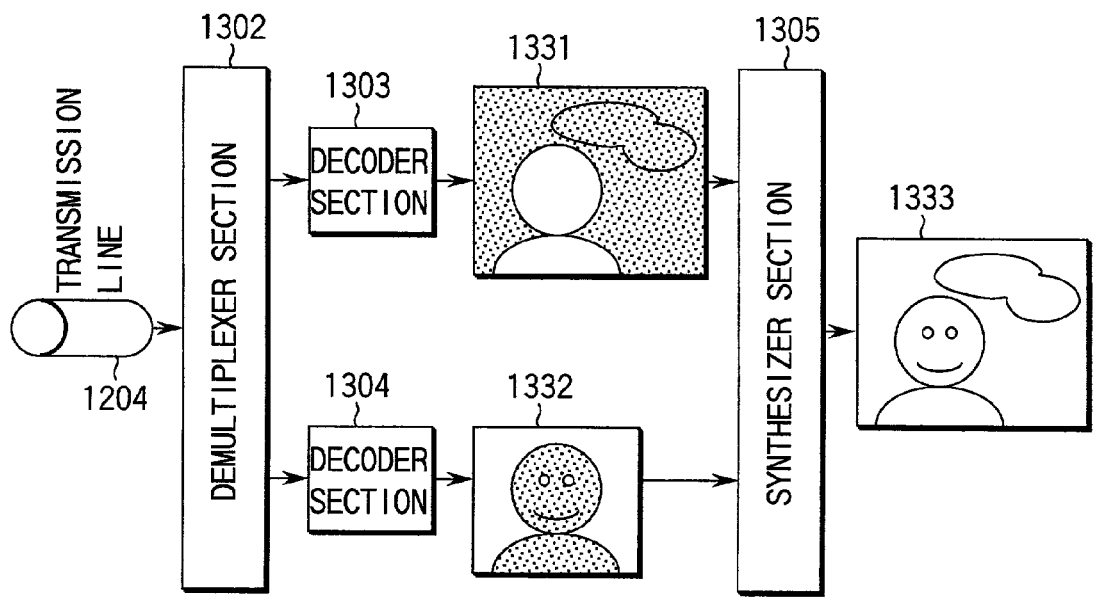
FIG. 17 is a view for explaining decoding of an arbitrary shape picture.

As shown in FIG. 15, the important information construction section 705 is made up of a switch section 2301, expansion header insertion determining section 2302, and arbitrary shape picture relating important information decoder section 2303.

The expansion header insertion determining section 2302 determines whether an expansion header is added to a packet header. The expansion header insertion determining section 2302 determines based on information of the packet header 735 input from the demultiplexing section 702 whether arbitrary shape picture coding is executed for the picture bit stream 732. If arbitrary shape picture coding is executed, the expansion header insertion determining section 2302 determines that an expansion header is added to a packet header, and outputs a control signal corresponding to the determination.

The switch section 2301 is a section opening/closing switch. When the expansion header insertion determining section 2302 determines that an expansion header is added to a packet header, the switch section 2301 closes a section to input information of the packet header 735 from the demultiplexing section 702 to the arbitrary shape picture relating important information decoder section 2303 in accordance with the control signal output from the expansion header insertion determining section 2302.

The arbitrary shape picture relating important information decoder section 2303 receives as input information 2333 information of the packet header 735 input via the switch section 2301. Based on this information, the arbitrary shape picture relating important information decoder section 2303 decodes information relating to arbitrary shape coding, and outputs it as the important information 636.

The operation of the important information construction section 705 having this arrangement will be described.

The expansion header insertion determining section 2302 decodes packet header information to determine for the input packet header 735 whether an expansion header is added to the packet header information. If the expansion header insertion determining section 2302 determines that an expansion header is added, it controls to close the switch section 2301, thereby outputting the packet header 735 as the packet header information 2333 to the arbitrary shape picture relating important information decoder section 2303.

The arbitrary shape picture relating important information decoder section 2303 decodes important information relating to arbitrary shape coding on the basis of the packet header information 2333, and outputs the decoded information as the important information 736 to the decoder section 703.

Accordingly, arbitrary shape picture relating important information can be decoded from information in an expansion header set to allow inserting arbitrary shape picture relating important information.

The technique of the second embodiment, as well as the first embodiment, can give error resilience equivalent to that of conventional rectangular picture coding to even arbitrary shape picture coding. Further, the expansion header of a transmission line protocol can be inserted without changing a bit stream for picture coding. This is effective in using an existing standard scheme and the like.

Similar to the modification to the first embodiment, the number of coded bits can be reduced by coding VW, VH, VHMSR, and VVMSR with variable lengths.

Note that the second embodiment has exemplified MPEG-4. However, as for transmission of arbitrary shape coding other than MPEG-4, the error resilience can be improved by adding similar information.

Figure 25:
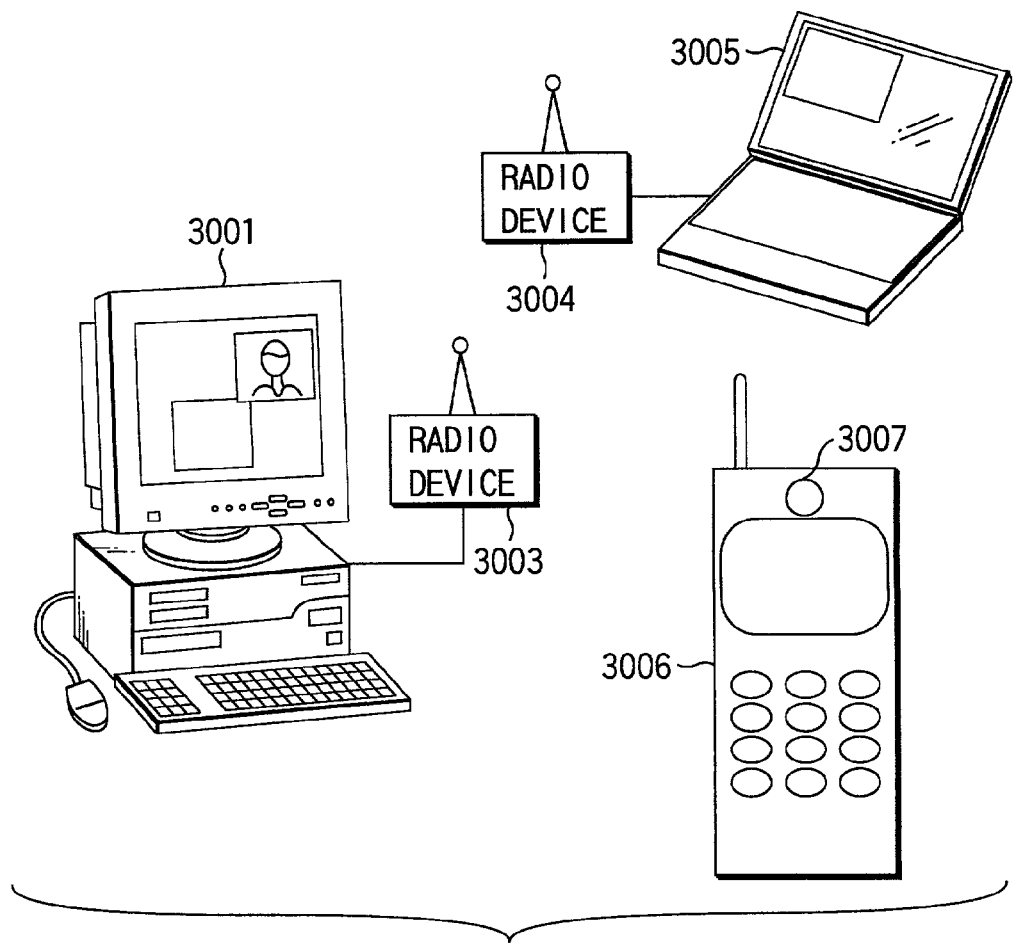
FIG. 25 is a view showing an example of a radio video transmission system adopting a coding/decoding apparatus according to the third embodiment of the present invention.

As an application of the present invention, the embodiment of a video picture transmission system adopting the coding apparatus/decoding apparatus of the present invention will be explained with reference to FIG. 25.

A video signal input by a camera (not shown) attached to a personal computer 3001 is coded by a coding apparatus (or coding software) incorporated in the personal computer 3001. The video signal output from the coding apparatus is transmitted by radio by a radio device 3003 together with other speech information and data information, and received by another radio device 3004. This radio device may be, e.g., a portable telephone, PHS, or radio LAN device. The signal received by the radio device 3004 is demultiplexed into the video signal, speech information, and data information. Of these pieces of information, the video signal is decoded by a decoding apparatus (or decoding software) incorporated in a notebook personal computer 3005, and displayed on the display of the notebook PC 3005.

On the other hand, a video signal input by a camera (not shown) attached to the notebook personal computer 3005 is similarly coded by a coding apparatus (or coding software) incorporated in the notebook personal computer 3005. The generated video signal is multiplexed with other speech information and data information, transmitted by radio by the radio device 3004, and received by the radio device 3003. The signal received by the radio device 3003 is demultiplexed into the video signal, speech information, and data information. Of these pieces of information, the video signal is decoded by a decoding apparatus (or decoding software) incorporated in the personal computer 3001, and displayed on the display of the personal computer 3001.

The coding/decoding apparatus according to the present invention can also be applied to video picture communication between the personal computer 3001 or notebook personal computer 3005 and a portable videophone 3006. A video signal generated by the coding apparatus incorporated in the personal computer 3001 or notebook personal computer 3005 and transmitted by the radio device 3003 or 3004 is received by a radio device incorporated in the portable videophone 3006. The signal received by the radio device is demultiplexed into the video signal, speech information, and data information. Of these pieces of information, the video picture is decoded by a decoding apparatus (or decoding software) incorporated in the portable videophone 3006, and displayed on the display of the portable videophone 3006.

On the other hand, a video signal input by a camera 3007 incorporated in the portable videophone 3006 is coded by a coding apparatus (or coding software) incorporated in the portable videophone 3006, similar to the personal computer and notebook personal computer 3005. The generated video signal is multiplexed with other speech information and data information, transmitted by radio by the radio device incorporated in the portable videophone 3006, and received by the radio device 3003 or 3004. The signal received by the radio device 3003 or 3004 is demultiplexed into the video signal, speech information, and data information. Of these pieces of information, the video signal is decoded by the decoding apparatus (or decoding software) incorporated in the personal computer 3001 or notebook personal computer 3005, and displayed on the display of the personal computer 3001 or notebook personal computer 3005.

Figure 26:
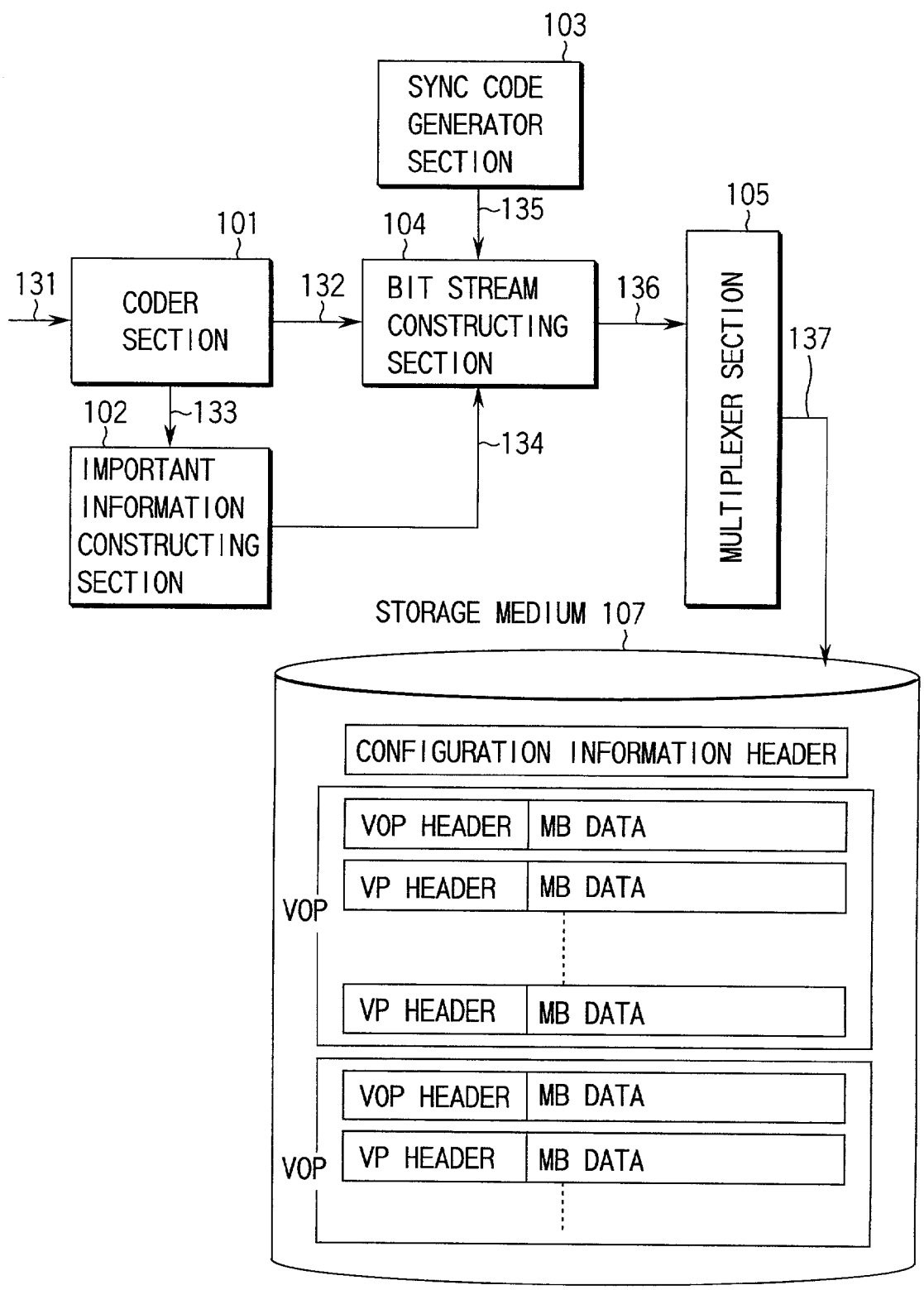
FIG. 26 is a block diagram showing a coding apparatus according to the fourth embodiment that corresponds to the coding apparatus according to the first embodiment.

FIG. 26 shows a coding apparatus according to the fourth embodiment that corresponds to the coding apparatus according to the first embodiment in FIG. 1. According to the fourth embodiment, a multiplexed bit stream output from a multiplexer section 105 is stored in a storage medium 107. The storage medium 107 is formatted in accordance with the present invention. That is, the storage medium 107 stores a shape information header, and a plurality of subsequent VOPs. The shape information header is a field storing information processed in common within the coded data, and stores information higher in order than the VOP header. The header stores, for example, the picture size of the rectangular picture and so on. Each VOP includes a plurality of macroblocks, and the first macroblock is made up of a VOP header and MB data set after the VOP header. The following macroblocks each is constructed by a VP header and MB data set after the VP header. The VP header is formatted in accordance with FIG. 4.

Figure 5:
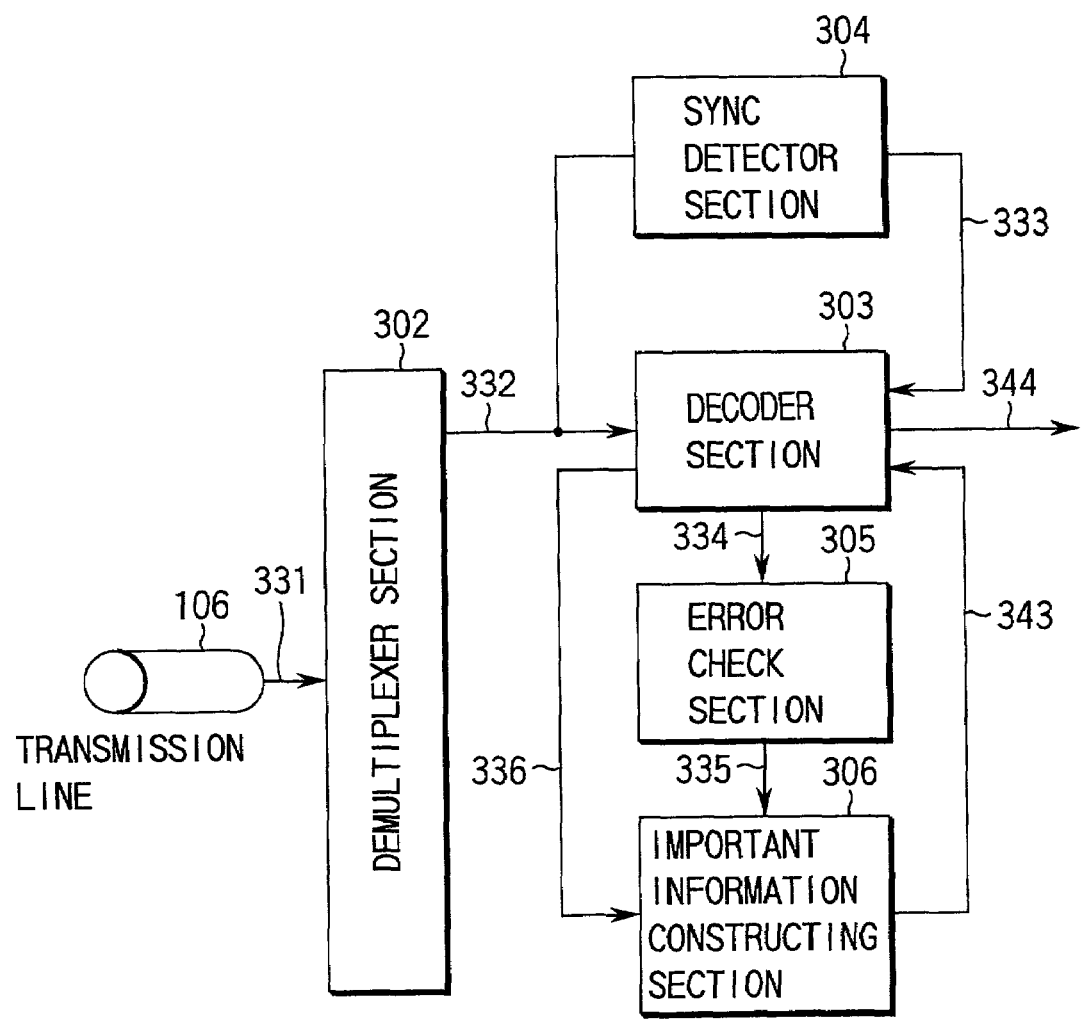
FIG. 5 is a block diagram showing the basic arrangement of a decoder section according to the first embodiment of the present invention.
Figure 27:
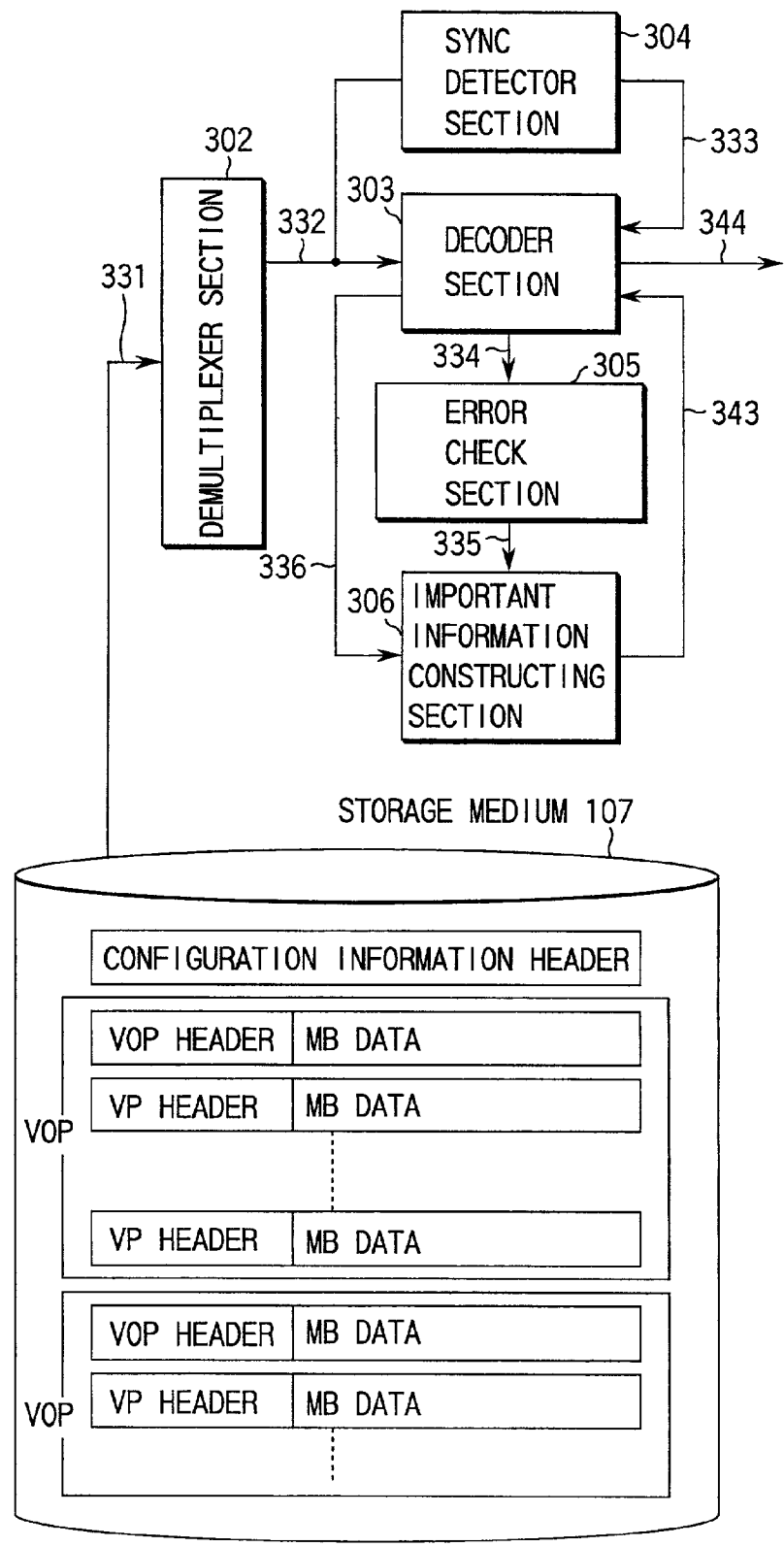
FIG. 27 is a block diagram showing a decoding apparatus according to the fourth embodiment that corresponds to the decoding apparatus according to the first embodiment.

FIG. 27 shows a decoding apparatus according to the fifth embodiment that corresponds to the decoding apparatus according to the first embodiment in FIG. 5. The decoding apparatus reads and decodes a multiplexed bit stream stored in the storage medium 107 by the coding apparatus of the fourth embodiment.

Figure 28:
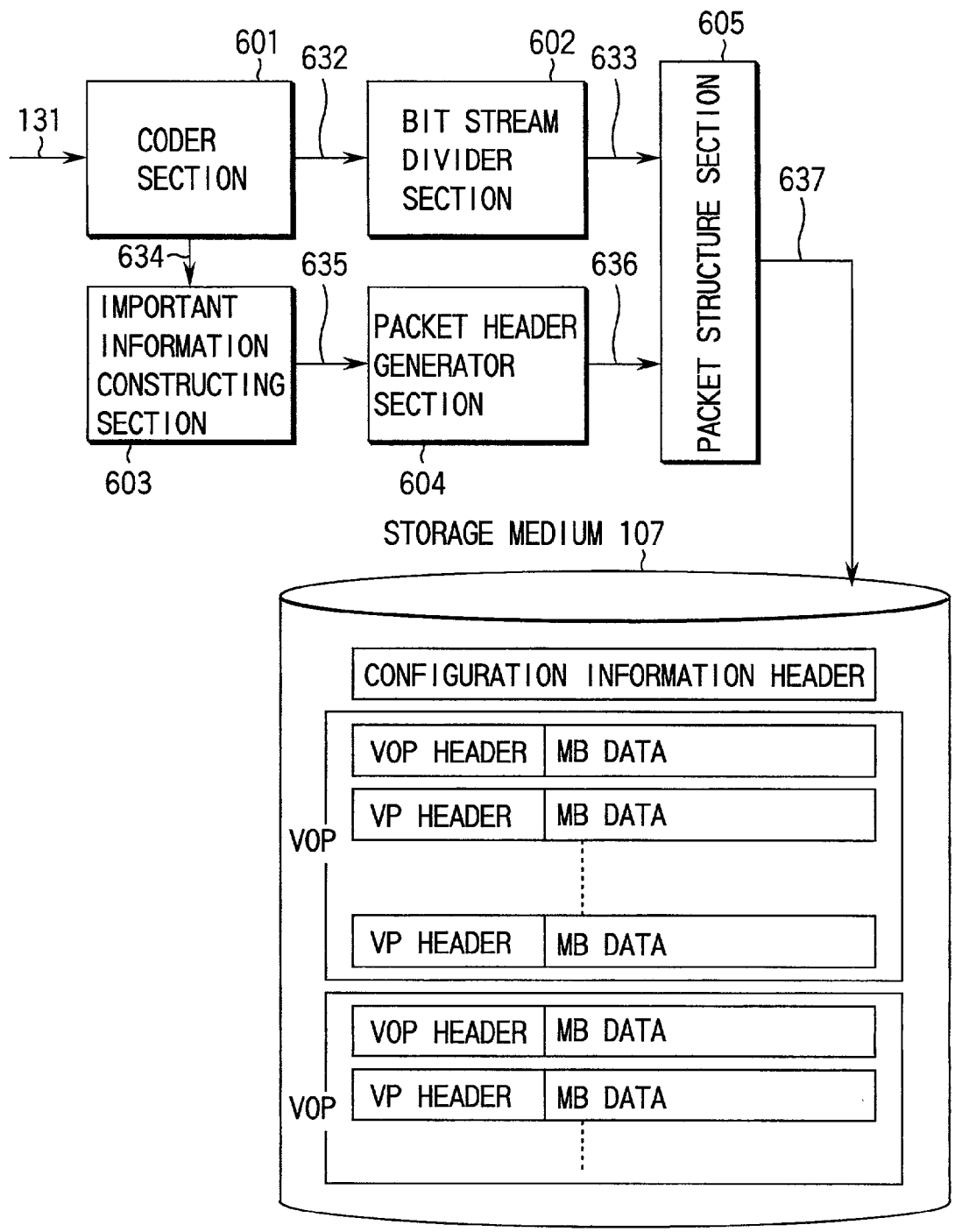
FIG. 28 is a block diagram showing a decoding apparatus according to the fifth embodiment that corresponds to the coding apparatus according to the second embodiment.

FIG. 28 shows a decoding apparatus according to the fifth embodiment that corresponds to the coding apparatus according to the second embodiment in FIG. 10. The coding apparatus stores multiplexed data output from a packet structure section 605 in a storage medium 107 in accordance with the format of the present invention. That is, the format includes a shape information header and a plurality of subsequent VOPs. Each of a plurality of macroblocks of each VOP includes a VOP header.

Figure 14:
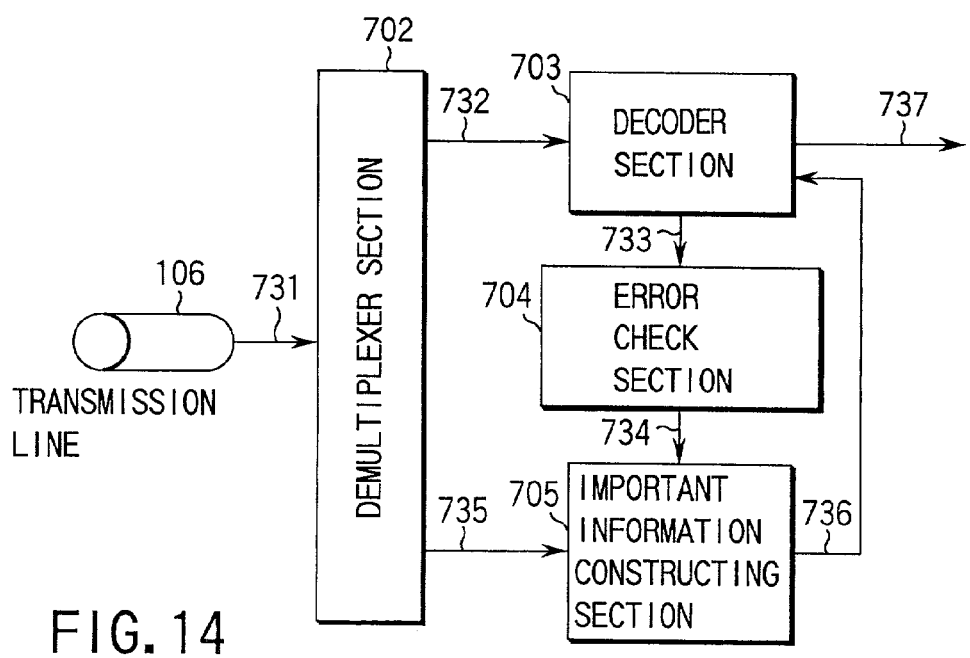
FIG. 14 is a block diagram showing the basic arrangement of a decoder section according to the second embodiment of the present invention.
Figure 29:
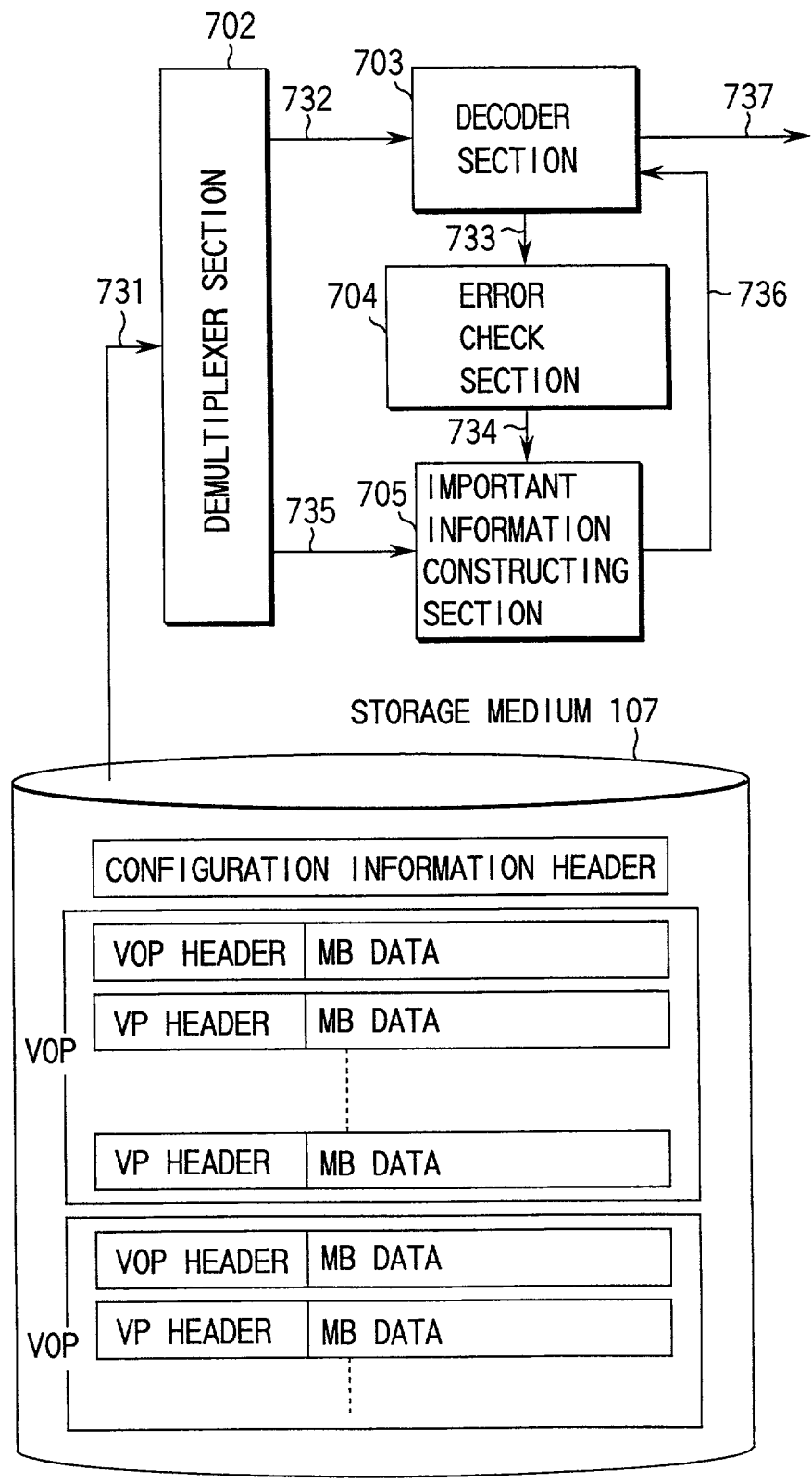
FIG. 29 is a block diagram showing a decoding apparatus according to the fifth embodiment that corresponds to the decoding apparatus according to the second embodiment.

FIG. 29 shows a decoding apparatus according to the fifth embodiment that corresponds to the decoding apparatus according to the second embodiment in FIG. 14. The decoding apparatus reads and decodes a multiplexed bit stream stored in the storage medium 107 by the coding apparatus of the fifth embodiment.

The processing contents of the decoder section 303 in FIG. 27 will be described with reference to FIG. 30.

Picture code streams are sequentially read from the storage medium 107 to detect sync codes (step S11). If each detected sync code is a VOP start code (YES in step S12), the flow executes processing of outputting a previously decoded VOP (frame) to a picture information output device (step S13). Then, a VOP header (in FIG. 29) subsequent to the VOP start code in the picture code stream is decoded (step S14). If the VOP header is normally decoded (YES in step S15), the decoded VOP header information (time information, VOP prediction mode, and the like) replaces information stored in the temporary memory section of the decoder section (step S16). Macroblock data (MB data in FIG. 29) subsequent to the VOP header is decoded to decode the video packet (step S17).

If the detected sync code is a resync marker (YES in step S18), a video packet header (macroblock number (MBA), video packet quantization parameter (SQ), and header extension code (HEC)) subsequent to the resync marker is decoded (step S19). If the header extension code HEC="0" in the video packet header (NO in step S20), the video packet is decoded (step S17). If the header extension code HEC="1" (YES in step S20), subsequent duplicated information (DUPH in FIG. 29) is decoded (step S21). Whether the picture has an arbitrary shape is checked (step S21-1), and if YES in step S21-1, arbitrary shape picture relating important information is decoded (step S21-2). If NO in step S21-1, the flow jumps to step S22. If the duplicated information is normally decoded (YES in step S22), this duplicated information is compared with information stored in the temporary memory section (step S23). If the duplicated information is the same as the information as a result of comparison (NO in step S23), macroblock data (MB data in FIG. 29) subsequent to the video packet header is decoded to decode the video packet (step S17). If the duplicated information is different from the information as a result of comparison (YES in step S23), this video packet is determined to belong to a VOP different from the previously decoded VOP. The flow executes processing of outputting a previously decoded VOP to the picture information output device (step S24), and the decoded duplicated information replaces information stored in the temporary memory device (step S25). Further, the video packet is decoded (step S17).

Figure 30:
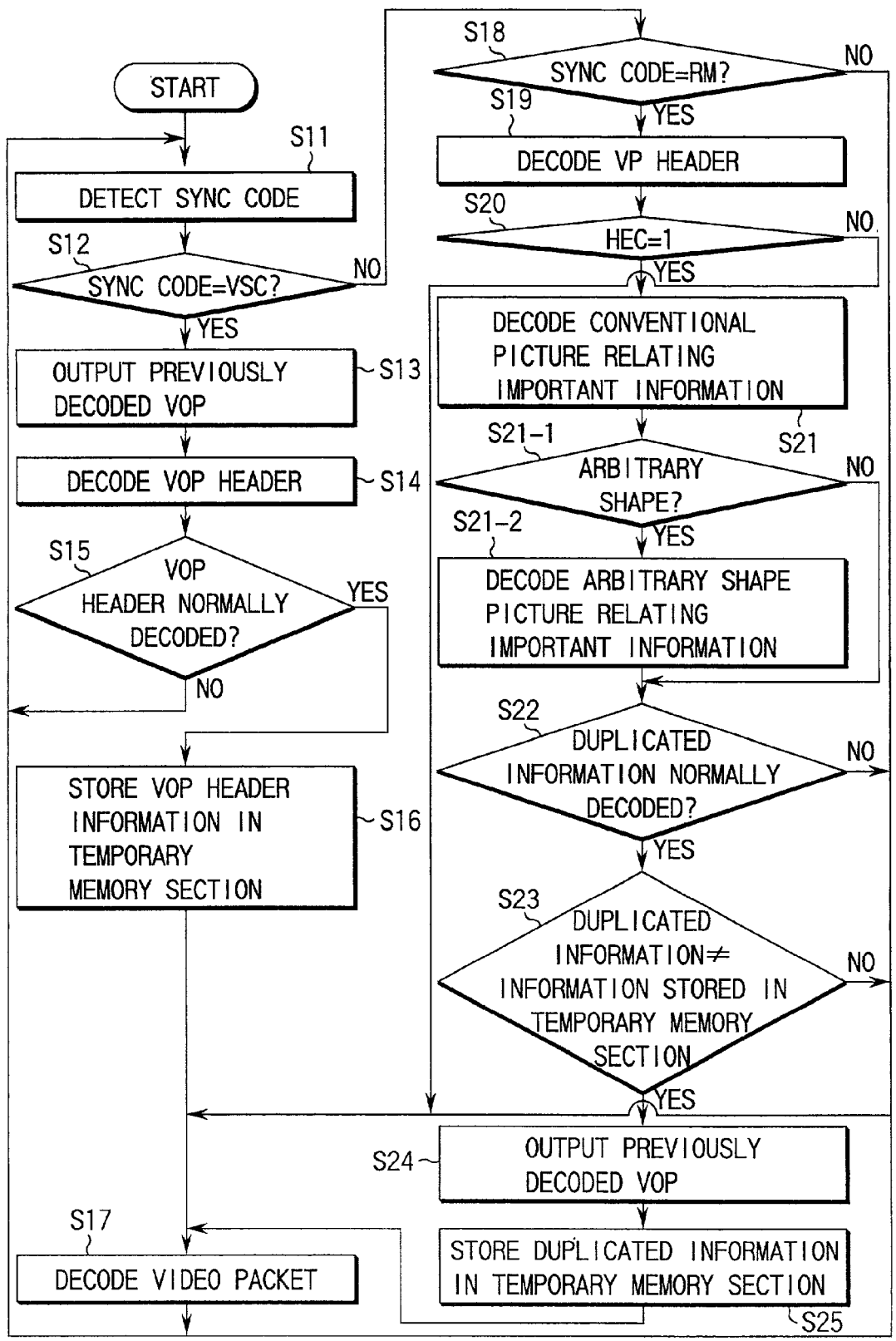
FIG. 30 is a flowchart of a decoding apparatus according to the third embodiment.

While picture code streams stored in a storage medium 810 are sequentially read, a series of processes starting from sync code detection shown in FIG. 30 are repeated to reconstruct video signals.

Instead of directly storing a picture code stream in the storage medium, a code steam obtained by coding speech and audio signals or a code stream obtained by multiplexing data, control information, and the like may be stored in the storage medium. In this case, before information stored in the storage medium is decoded by a picture coder device 820, a demultiplexer device performs processing of demultiplexing a picture code stream, speech/audio code stream, data, and control information. The demultiplexed picture code stream is decoded by the coder device 820.

In FIG. 29, information stored in the storage medium 810 is transmitted to the decoder device 820 via a signal line 80. Alternatively, information may be transmitted via a transmission line such as a cable, radio, or infrared rays.

According to the present invention, a code stream stored in the storage medium includes duplicated important information. Even if an error exists in information stored in the storage medium, or an error occurs in a signal line or transmission line for transmitting information stored in the storage medium to a playback picture, the playback picture almost free from any degradation can be played back.

As has been described above, the present invention can realize error resilience equivalent to that of conventional rectangular picture coding even when an arbitrary shape picture is coded. The present invention uses the expansion header of RTP as a protocol used to transmit video/speech data. In transmitting data in units of packets, the data can be coded and transmitted in accordance with an existing standard scheme such as MPEG-4. In addition, error resilience equivalent to that of conventional rectangular picture coding can be achieved.

INDUSTRIAL APPLICABILITY

According to the present invention described above, the error resilience similar to the conventional rectangular picture coding method can be attained even in arbitrary shape picture coding. The present invention can be applied to an information transmission system for transmitting the coded motion picture/still picture, using a wire communication network such as an ISDN (Integrated Services Digital Network) or internet, or a radio communication network such as PHS or a satellite communication.

What is claimed is:

1. A video coding apparatus comprising:
    a coder section for generating coded information obtained by arbitrary shape coding an input video picture as a bit stream;
    an important information constructing section for extracting, from the coded information obtained by said coder section, important information representing a rule, of coding a set of predetermined bit streams, and constructing the important information;
    a sync signal generator section for generating a sync signal; and
    a bit stream constructing section for adding the sync signal output from said sync signal generator means, an HEC code representing whether or not the important information is duplexed and the important information constructed by said important information constructing section to the bit stream coded by said coder section, to construct the bit stream,
    wherein said important information includes a 13-bit signal indicative of an image width, a 13-bit signal indicative of an image height, a 13-bit signal indicative of an X coordinate used for image arrangement, a 13-bit signal indicative of a Y coordinate used for image arrangement, a 1-bit signal representing whether or not image information is reduced and coded, and a 1-bit signal indicative of a coding mode of the image information, said signals being arranged in the order mentioned.

* * * * *